(12) United States Patent
Karasawa et al.

(10) Patent No.: US 11,216,153 B2
(45) Date of Patent: Jan. 4, 2022

(54) INFORMATION PROCESSING DEVICE, DISPLAY CONTROL METHOD, AND PROGRAM

(71) Applicant: SONY CORPORATION, Tokyo (JP)

(72) Inventors: Hidenori Karasawa, Kanagawa (JP); Takeo Inagaki, Tokyo (JP); Hiroyuki Masuda, Kanagawa (JP); Hiromu Takizawa, Kanagawa (JP); Takehiro Hagiwara, Kanagawa (JP); Genta Kondo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 102 days.

(21) Appl. No.: 15/307,575

(22) PCT Filed: Feb. 27, 2015

(86) PCT No.: PCT/JP2015/055748
§ 371 (c)(1),
(2) Date: Oct. 28, 2016

(87) PCT Pub. No.: WO2015/174120
PCT Pub. Date: Nov. 19, 2015

(65) Prior Publication Data
US 2017/0052678 A1 Feb. 23, 2017

(30) Foreign Application Priority Data
May 15, 2014 (JP) .............................. JP2014-101510

(51) Int. Cl.
*G06F 3/0481* (2013.01)
*G06F 9/451* (2018.01)
(Continued)

(52) U.S. Cl.
CPC ..... *G06F 3/04817* (2013.01); *G05B 19/0426* (2013.01); *G06F 3/0481* (2013.01);
(Continued)

(58) Field of Classification Search
CPC ...... G06F 3/04817; G06F 8/34; G06F 3/0481; G06F 9/451; G06F 3/0482;
(Continued)

(56) References Cited

U.S. PATENT DOCUMENTS 8,390,833 B2 * 3/2013 Takahashi ............. G06F 3/0486
358/1.13
2006/0290716 A1 * 12/2006 Gunji ........................ G06F 8/34
345/650

(Continued)

FOREIGN PATENT DOCUMENTS

CN 1877524 A 12/2006
JP H11-039145 A 2/1999
(Continued)

OTHER PUBLICATIONS

Nov. 21, 2017, European Search Report issued for related EP application No. 15793171.8.
(Continued)

*Primary Examiner* — Keith D Bloomquist
(74) *Attorney, Agent, or Firm* — Paratus Law Group, PLLC

(57) ABSTRACT

There is provided an information processing device to enable a user to intuitively perform an operation of setting a linked operation of hardware elements or software elements, the information processing device including: a display control unit configured to cause a plurality of icons indicating hardware elements or software elements that perform a linked operation together, and a link connecting the plurality of icons to each other to be displayed. A spatial sequence of the plurality of icons formed by the link corresponds to a temporal sequence of operations of the software elements or the hardware elements indicated by the plurality of icons.

24 Claims, 37 Drawing Sheets

(51) Int. Cl.
*G05B 19/042* (2006.01)
*G06F 3/0482* (2013.01)
*G06F 3/0484* (2013.01)
*G06F 3/0488* (2013.01)

(52) U.S. Cl.
CPC ........ *G06F 3/0482* (2013.01); *G06F 3/04845* (2013.01); *G06F 3/04883* (2013.01); *G06F 9/451* (2018.02); *G05B 2219/23258* (2013.01); *G05B 2219/25067* (2013.01); *G06F 3/04842* (2013.01)

(58) Field of Classification Search
CPC ............. G06F 3/04845; G06F 3/04883; G06F 3/04842; G05B 19/0426; G05B 2219/25067; G05B 2219/23258; G05B 2219/36159
See application file for complete search history.

(56) References Cited

U.S. PATENT DOCUMENTS

| | | | |
|---|---|---|---|
| 2007/0067373 A1* | 3/2007 | Higgins | G06F 11/3013 |
| 2012/0013540 A1 | 1/2012 | Hogan | |
| 2012/0210265 A1* | 8/2012 | Delia | G06F 3/0482 |
| | | | 715/771 |
| 2014/0040792 A1* | 2/2014 | Kodosky | G06F 3/0481 |
| | | | 715/762 |
| 2014/0172953 A1 | 6/2014 | Blanksteen | |
| 2014/0280445 A1* | 9/2014 | Hori | G06Q 10/06 |
| | | | 709/201 |
| 2014/0282193 A1* | 9/2014 | Bann | G06F 3/04817 |
| | | | 715/771 |
| 2014/0372856 A1* | 12/2014 | Radakovitz | G06F 17/246 |
| | | | 715/220 |

FOREIGN PATENT DOCUMENTS

| | | |
|---|---|---|
| JP | 2000-236585 A | 8/2000 |
| JP | 2005-065156 A | 3/2005 |
| JP | 2005-072764 A | 3/2005 |
| JP | 2005-176345 A | 6/2005 |
| JP | 2006-196956 A | 7/2006 |
| JP | 2006-215206 A | 8/2006 |
| JP | 2006-276283 A | 10/2006 |
| JP | 2006-344076 A | 12/2006 |
| JP | 2007-195161 A | 8/2007 |
| JP | 2008-058465 A | 3/2008 |
| JP | 2008-282260 | 11/2008 |
| JP | 2012-521056 | 9/2012 |
| JP | 2014-032501 | 2/2014 |
| KR | 10-2005-0002108 A | 1/2005 |

OTHER PUBLICATIONS

Labview + NXT Part 2: Touch Sensor, https://www.youtube.com/watch?v=n0YyisgB_CI, Nov. 13, 2010.
Bickford, Advanced Programming with LEGO NXT MindStorms, Maine Robotics, Sep. 13, 2011.
Oct. 15, 2018, European Communication issued for related EP Application No. 15793171.8.
Haugen, Introduction to LabVIEW 8.5, TechTeach, Aug. 31, 2008, retrieved from: http://techteach.no/labview/lv85/labview/index.htm.
Kenta Mishima, LEGO Mindstorms NXT, LabVIEW, Jun. 1, 2011, pp. 56-57, 69-71.
Dec. 25, 2018, Japanese Office Action issued for related JP Application No. 2016-519136.
May 23, 2019, Chinese Office Action issued for related CN Application No. 201580023741.4.
Apr. 23, 2019, European Communication issued for related EP Application No. 15793171.8.
Feb. 4, 2020, Japanese Office Action issued for related JP Application No. 2019-071709.
Schramm, Nurance's 'Nina' vocal assistant SDK may voiceprint users for authentication, Engadget, Aug. 6, 2012.

* cited by examiner

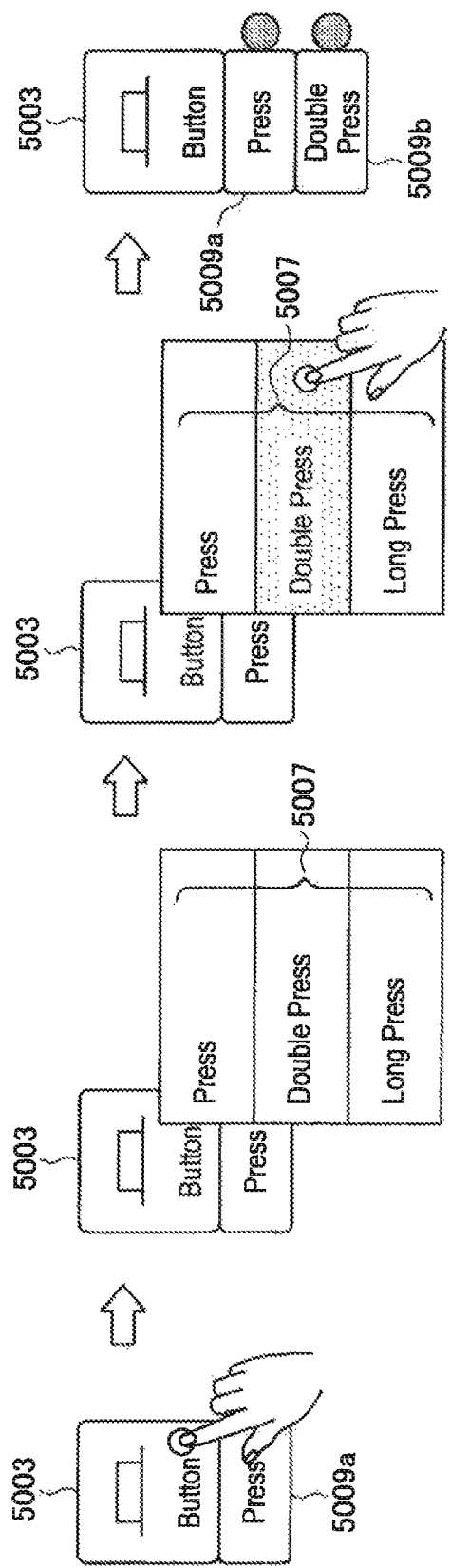

FIG. 20
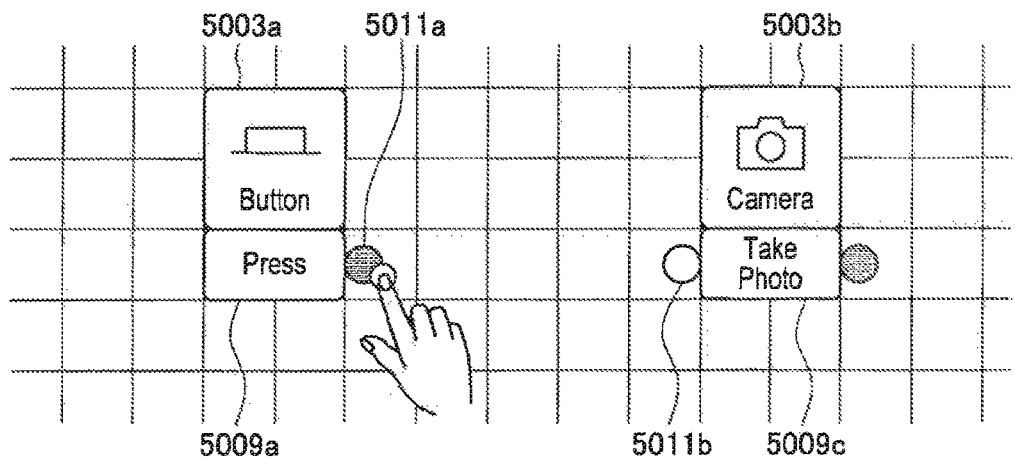
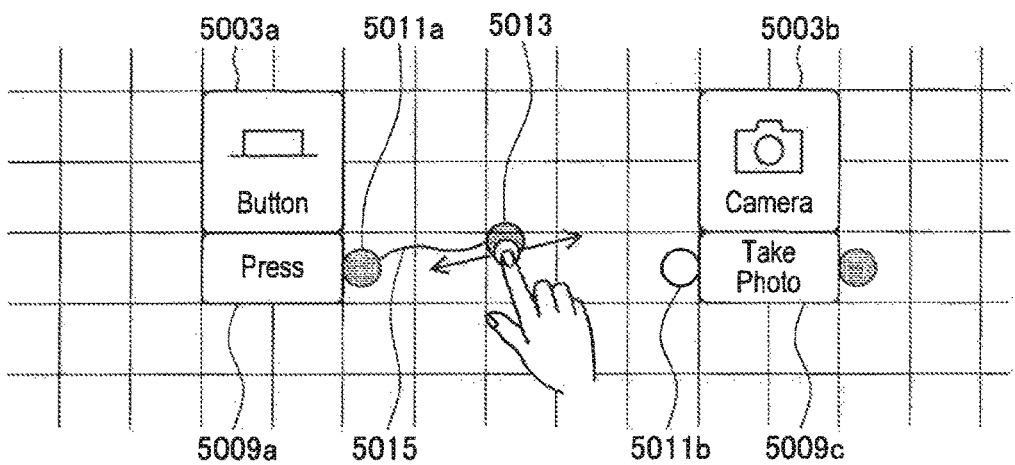
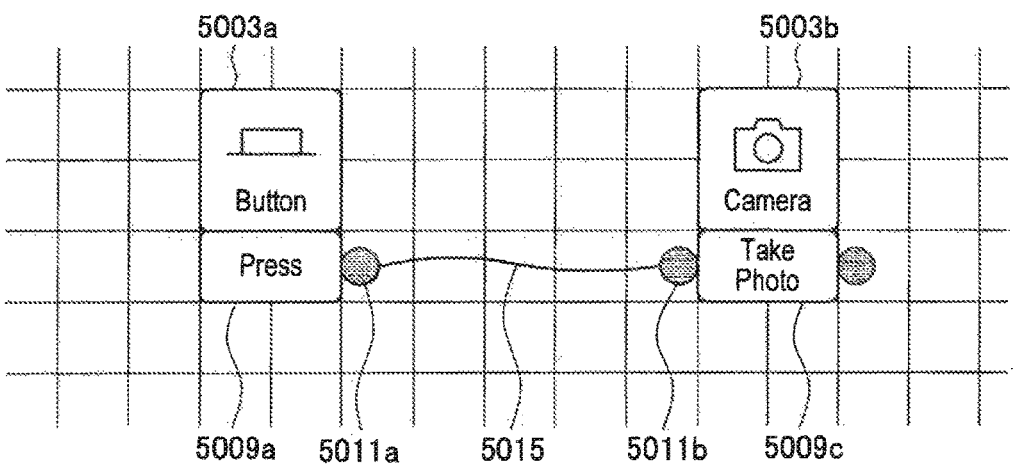

INFORMATION PROCESSING DEVICE, DISPLAY CONTROL METHOD, AND PROGRAM

CROSS REFERENCE TO PRIOR APPLICATION

This application is a National Stage Patent Application of PCT International Patent Application No. PCT/JP2015/055748 (filed on Feb. 27, 2015) under 35 U.S.C. §371, which claims priority to Japanese Patent Application No. 2014-101510 (filed on May 15, 2014), which are all hereby incorporated by reference in their entirety.

TECHNICAL FIELD

The present disclosure relates to an information processing device, a display control method, and a program.

BACKGROUND ART

Setting a plurality of apparatuses provided inside a house or the like to function in cooperation has become a general practice. For example, Patent Literature 1 introduces a technology of effectively supporting use of functions implemented by cooperative apparatuses.

CITATION LIST

Patent Literature

Patent Literature 1: JP 2014-32501A

SUMMARY OF INVENTION

Technical Problem

In the technology described in Patent Literature 1 mentioned above, operations such as registration of an apparatus in a system and the like are executed using a console displayed on a screen of a smartphone. In addition, in the technology described in Patent Literature 1, a user can newly register a linked operation of apparatuses. However, a user interface presented for new registration of a linked operation of Patent Literature 1 is text-based, and there is room for further improvement such as in intuitiveness of operations.

Thus, the present disclosure proposes a novel and improved information processing device, display control method, and program which enable a user to intuitively perform an operation of setting a linked operation of hardware elements or software elements.

Solution to Problem

According to the present disclosure, there is provided an information processing device including a display control unit configured to cause a plurality of icons indicating hardware elements or software elements that perform a linked operation together, and a link connecting the plurality of icons to each other to be displayed. A spatial sequence of the plurality of icons formed by the link corresponds to a temporal sequence of operations of the software elements or the hardware elements indicated by the plurality of icons.

According to the present disclosure, there is provided a display control method including causing a plurality of icons indicating hardware elements or software elements that perform a linked operation together, and a link connecting the plurality of icons to each other to be displayed. A spatial sequence of the plurality of icons formed by the link corresponds to a temporal sequence of operations of the software elements or the hardware elements indicated by the plurality of icons.

According to the present disclosure, there is provided a program to be executed by a processing circuit of an information processing device to realize a function of causing a plurality of icons indicating hardware elements or software elements that perform a linked operation together, and a link connecting the plurality of icons to each other to be displayed. A spatial sequence of the plurality of icons formed by the link corresponds to a temporal sequence of operations of the software elements or the hardware elements indicated by the plurality of icons.

Advantageous Effects of Invention

According to the present disclosure described above, it is possible to enable a user to intuitively perform an operation of setting a linked operation of hardware elements or software elements.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 19B is a diagram for describing operation icons displayed in the first embodiment of the present disclosure.

FIG. 20 is a diagram for describing a setting of a link between icons in the first embodiment of the present disclosure.

DESCRIPTION OF EMBODIMENT(S)

Figure 1:
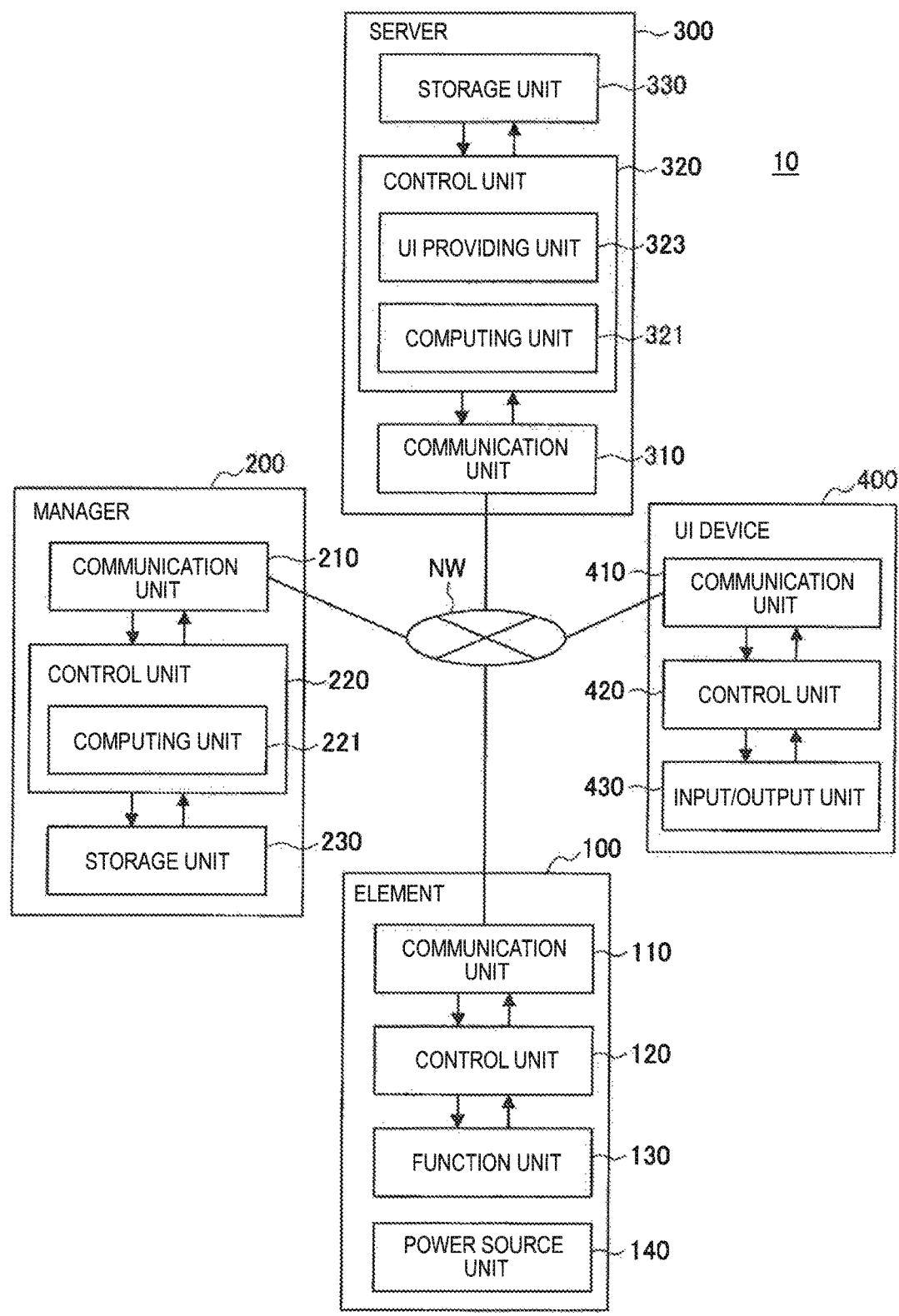
FIG. 1 is a diagram illustrating a schematic configuration of a system to which the technology according to an embodiment of the present disclosure can be applied.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Example of applicable system
1-1. Schematic configuration
1-2. Example of specific configuration
1-3. Example of user interface
1-4. Example of linked operation
2. Embodiments of present disclosure
2-1. First embodiment
2-2. Second embodiment
3. Hardware configuration
4. Supplement 1. Example of Applicable System 1-1. Schematic Configuration FIG. 1 is a diagram illustrating a schematic configuration of a system to which the technology according to an embodiment of the present disclosure can be applied. Referring to FIG. 1, the system 10 includes an element 100, a manager 200, a server 300, and a user interface (UI) device 400. These devices are connected to each other via a network NW. The network includes, for example, Bluetooth (a registered trademark), Wi-Fi, the Internet, or the like. Note that, although description will be provided with regard to the system 10 as an example below, the technology according to an embodiment of the present disclosure may also be applied to various other systems.

The element 100 is a device that includes a communication unit 110, a control unit 120, a function unit 130, and a power source unit 140. The communication unit 110 includes a communication device which communicates with the manager 200 and/or another element 100 via the network NW. The control unit 120 is realized with, for example, a microcontroller, a central processing unit (CPU), or the like to control the function unit 130. The function unit 130 includes, for example, a sensor or an actuator, and realizes functions that are unique to each element 100. The power source unit 140 includes a battery, a power plug, and the like to supply power for causing the communication unit 110, the control unit 120, and the function unit 130 to operate. Note that, although devices other than the element 100 also have power source units, illustration thereof is omitted.

The manager 200 is a device which includes a communication unit 210, a control unit 220, and a storage unit 230. The communication unit 210 can include a communication device which communicates with the element 100, the server 300, and the UI device 400 via the network NW. The control unit 220 is realized with, for example, a microcontroller, or a CPU, and controls communication between elements 100, and between the elements 100 and the server 300 via the communication unit 210. The control unit 220 can include a computing unit 221. The computing unit 221 executes computation on information received from the element 100, information to be transmitted to the element 100, information to be transmitted to the server 300, information received from the server 300, and the like. The storage unit 230 includes a memory or a storage to store information exchanged through communication controlled by the control unit 220, information computed by the computing unit 221, and the like.

The server 300 includes a communication unit 310, a control unit 320, and a storage unit 330. The communication unit 310 includes a communication device which communicates with the manager 200 via the network NW. The control unit 320 is realized with, for example, a microcontroller, a CPU, or the like, and can include a computing unit 321 and a UI providing unit 323. The computing unit 321 executes computation on information received from the element 100 or the manager 200, information to be transmitted to the element 100 or the manager 200, information received from another server, information to be transmitted to another server, or the like. The UI providing unit 323 provides a UI for allowing a user to designate a combination of the element 100 and/or the manager 200 or to check various kinds of information. The UI is provided via, for example, a display, a touch panel, and the like included in an input/output unit 430 of the UI device 400. The storage unit 330 includes a memory or a storage for storing various kinds of information with regard to the element 100, a program for causing a plurality of elements 100 to operate in combination, software combined with the element 100, information computed by the computing unit 321, and the like.

Here, the storage unit 330 of the server 300 stores, for example, identification information (ID) of elements 100 included in the system 10. Elements 100 can be added to the system 10 when necessary. In addition, the storage unit 330 also stores a program for causing a plurality of elements 100 to operate in combination. The program can be added by, for example, a user, a developer, or a system manager when necessary. Furthermore, the storage unit 330 stores software. The software is executed in combination with, for example, the element 100 to realize a function. Alternatively, a function may be realized when software is executed in combination. Functions realized by software can include, for example, provision of materials such as sounds and images, a timer, a calendar, an analysis function including image recognition and sound recognition, an information acquisition function from external services such as weather forecasts, news, and the like. The software can be added by, for example, a user, a developer, or a system manager when necessary.

On the other hand, the UI providing unit 323 of the server 300 provides a UI via, for example, a display and a touch panel included in the input/output unit 430 of the UI device 400. A user can select, for example, a program for causing the plurality of elements 100 to operate in combination from a program installed in the element 100 or the manager 200 and a program provided by the server 300 via this UI. In addition, the user can designate a combination of the plurality of elements 100, a combination of the elements 100 and the software, and a combination of a plurality of pieces of software via the UI. As a designated combination is saved in the storage unit 330 of the server 300 as a program and this program is executed by the element 100 and the software, the user can obtain a desired application.

The UI device 400 is a device which includes a communication unit 410, a control unit 420, and the input/output unit 430. The communication unit 410 can include a communication device which communicates with the manager 200 and the server 300 via the network NW. The control unit 420 is realized with, for example, a microcontroller, a CPU, or the like, to control the input/output unit 430 and control exchange of information via the communication unit 410. The input/output unit 430 includes, for example, a display, a speaker, a touch panel, and the like, to present various kinds of information to the user via the UI, and receives inputs of operations from the user.

1-2. Example of Specific Configuration

First Example

Figure 2:
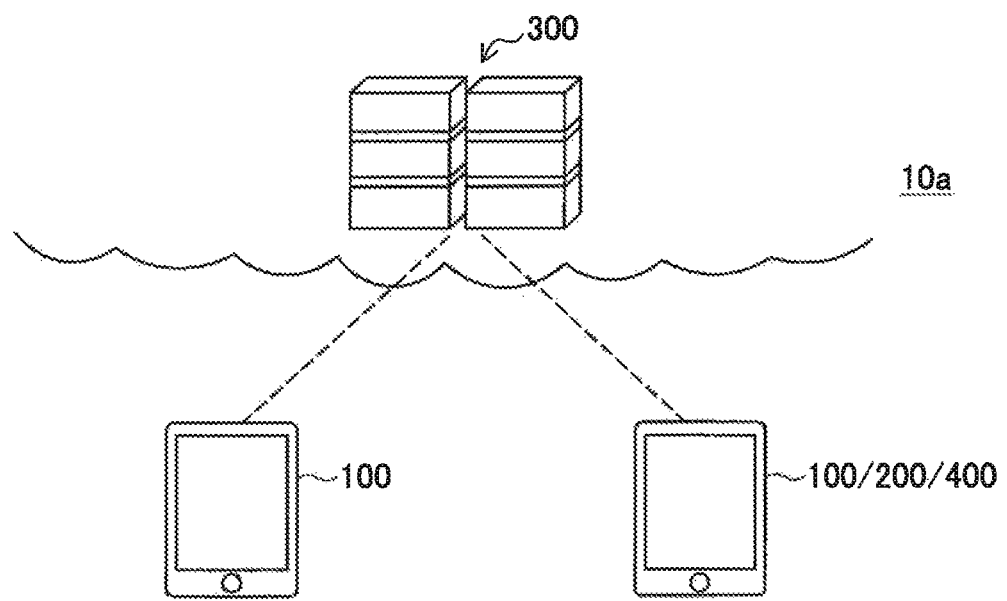
FIG. 2 is a diagram illustrating an example of a first specific configuration of the system illustrated in FIG. 1.

FIG. 2 is a diagram illustrating a first example of a specific configuration of the system illustrated in FIG. 1. Referring to FIG. 2, a system 10a includes a first tablet functioning as an element 100, a second tablet functioning as an element 100, a manager 200, and a UI device 400, and a server 300.

The first and second tablets each include a display, a touch panel, a CPU, a sensor, and the like. In the system 10a, one of the two tablets functions as the element 100, the manager 200, and the UI device 400, and the other functions as an element 100. The roles of these tablets may be interchangeable, and a tablet functioning as the manager 200 or the UI device 400 may be changed according to a situation. In the system 10a, for example, a user can cause the two tablets to operate in combination using various sensors that the tablets have, and thereby can realize a function that he or she desires.

Note that the first and second tablets in the example illustrated in FIG. 2 are examples of terminal devices each having the function unit 130 (a sensor or the like) for functioning as the element 100 and the control unit 220 (a CPU or the like) for functioning as the manager 200. Such a terminal device is not limited to a tablet, and may be another type of device such as a smartphone. In addition, the number of terminal devices included in the system 10a is not limited to that in the illustrated example, and the number may be, for example, three or more.

Second Example

Figure 3:
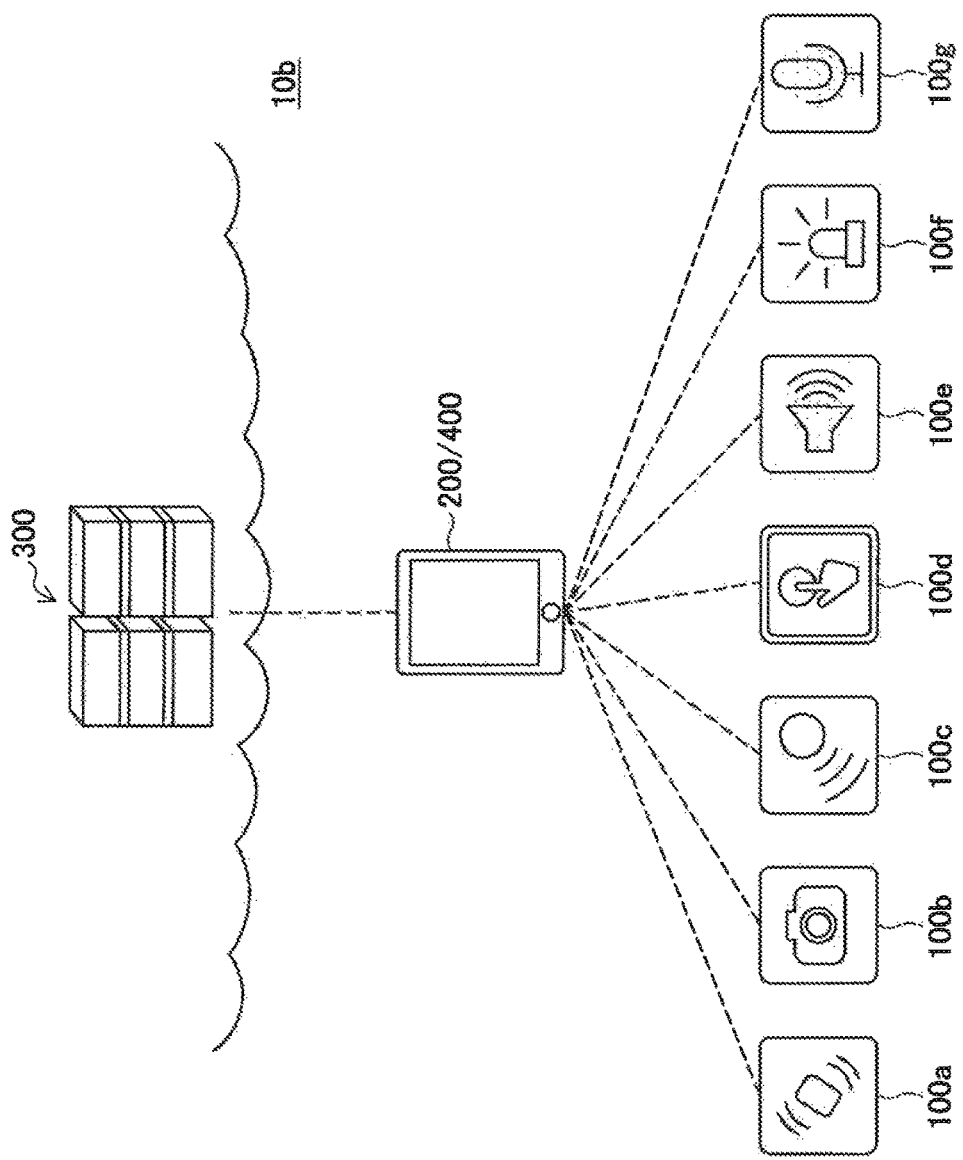
FIG. 3 is a diagram illustrating an example of a second specific configuration of the system illustrated in FIG. 1.

FIG. 3 is a diagram illustrating a second example of a specific configuration of the system illustrated in FIG. 1. Referring to FIG. 3, the system 10b includes elements 100a to 100g, a tablet functioning as the manager 200 and a UI device 400, and a server 300.

In the system 10b, the tablet functions as the manager 200 and the UI device 400. As in the first example described above, the tablet may be replaced with another device such as a smartphone. In the illustrated example, the elements 100 include an acceleration sensor 100a, a camera 100b, a human sensor 100c, a button 100d, a speaker 100e, a light emitting diode (LED) lamp 100f, and a microphone 100g. Each of the elements 100 communicates with the tablet through wireless communication such as Bluetooth (a registered trademark), and performs linked operations under control of the manager 200 realized with the tablet.

Note that, although some of or all the acceleration sensor 100a to the microphone 100g are illustrated as elements 100 in examples below, types of elements 100 to be used in each of the examples are not intended to be limited. In each of the examples, the system 10 can include any of the acceleration sensor 100a to the microphone 100g or another element 100 of an arbitrary type.

Third Example

Figure 4:
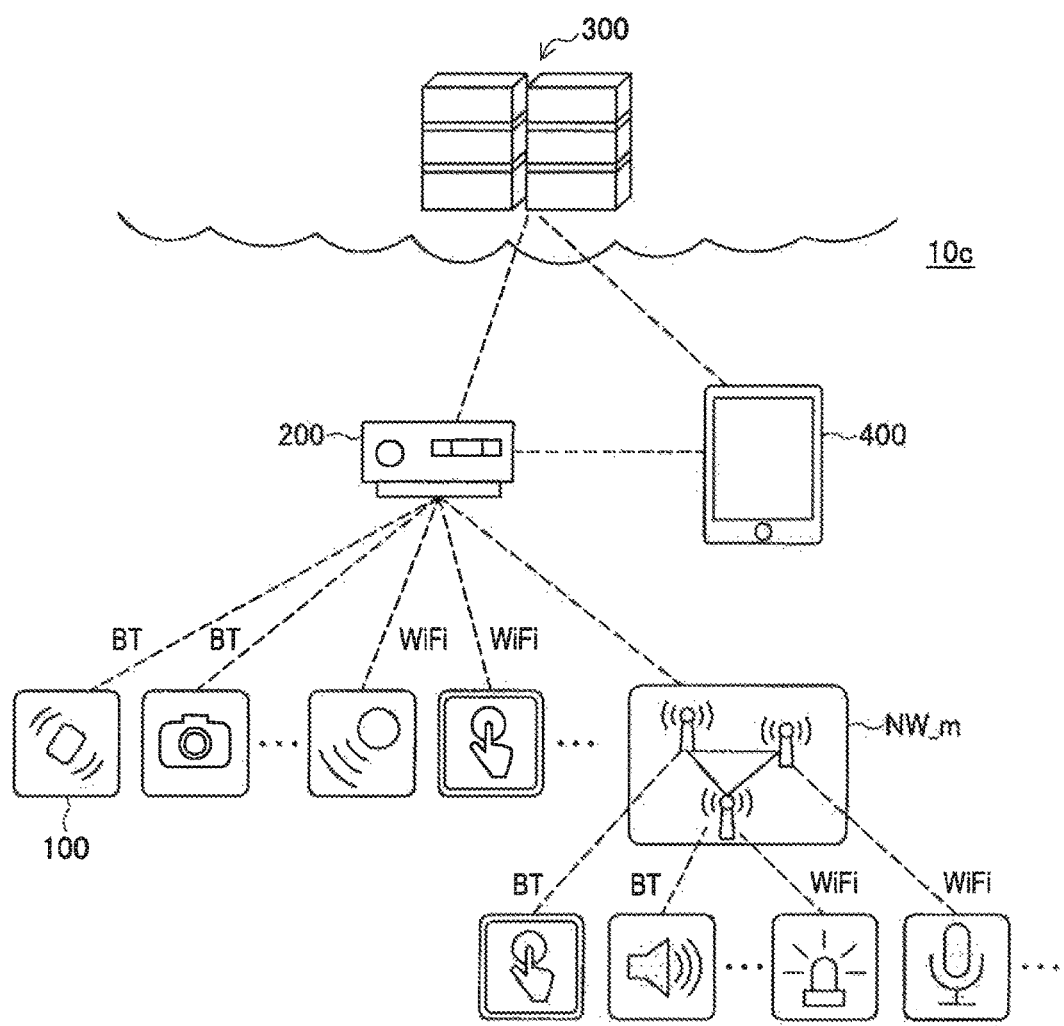
FIG. 4 is a diagram illustrating an example of a third specific configuration of the system illustrated in FIG. 1.

FIG. 4 is a diagram illustrating a third example of a specific configuration of the system illustrated in FIG. 1. Referring to FIG. 4, a system 10c includes elements 100, a manager 200, a tablet functioning as a UI device 400, and a server 300.

In the system 10c, the manager 200 is separate from the tablet functioning as the UI device 400. The manager 200 may be realized with, for example, a dedicated device, or as one function of a base station of Wi-Fi or the like. As in the first and second examples described above, the tablet functioning as the UI device 400 may be replaced with another device such as a smartphone. The manager 200 and the tablet can communicate with the server 300 independently from each other.

In addition, when a setting of the system 10c is changed via a UI provided by the tablet, the tablet may transmit setting information directly to the manager 200 via Wi-Fi or the like.

In addition, the example of FIG. 4 indicates that not only Bluetooth (a registered trademark) but also Wi-Fi can be used in communication between the manager 200 and the element 100. Furthermore, for a connection with an element 100 in a remote location, a mesh network repeater NW_m based on Wi-Fi or the like is used. Various types of wireless communication such as Bluetooth (a registered trademark) or Wi-Fi can be used in communication between the elements 100 and the manager 200, and/or between the elements 100 in other examples, without being limited to the illustrated third example.

Fourth Example

Figure 5:
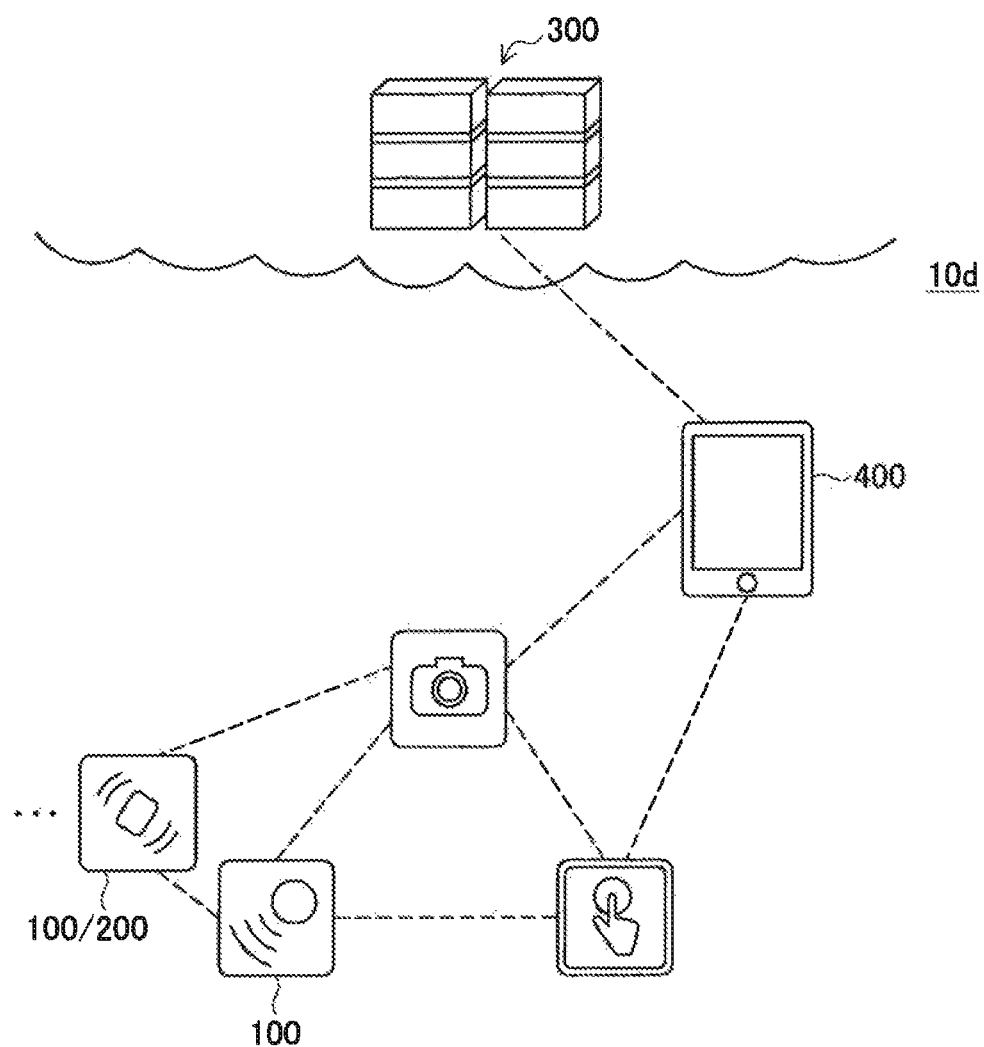
FIG. 5 is a diagram illustrating an example of a fourth specific configuration of the system illustrated in FIG. 1.

FIG. 5 is a diagram illustrating a fourth example of a specific configuration of the system illustrated in FIG. 1. Referring to FIG. 5, a system 10d includes elements 100, at least one of which functions as a manager 200, a tablet functioning as a UI device 400, and a server 300.

In the system 10d, at least one of the elements 100 functions as the manager 200, unlike in the first to third examples described above. In addition, in the system 10d, the elements 100 form a mesh network based on Bluetooth (a registered trademark) or the like. With this configuration, even when communication between the server 300 and the UI device 400 (the tablet) is temporarily disconnected in the system 10d, the elements 100 can autonomously perform a linked operation.

Fifth Example

Figure 6:
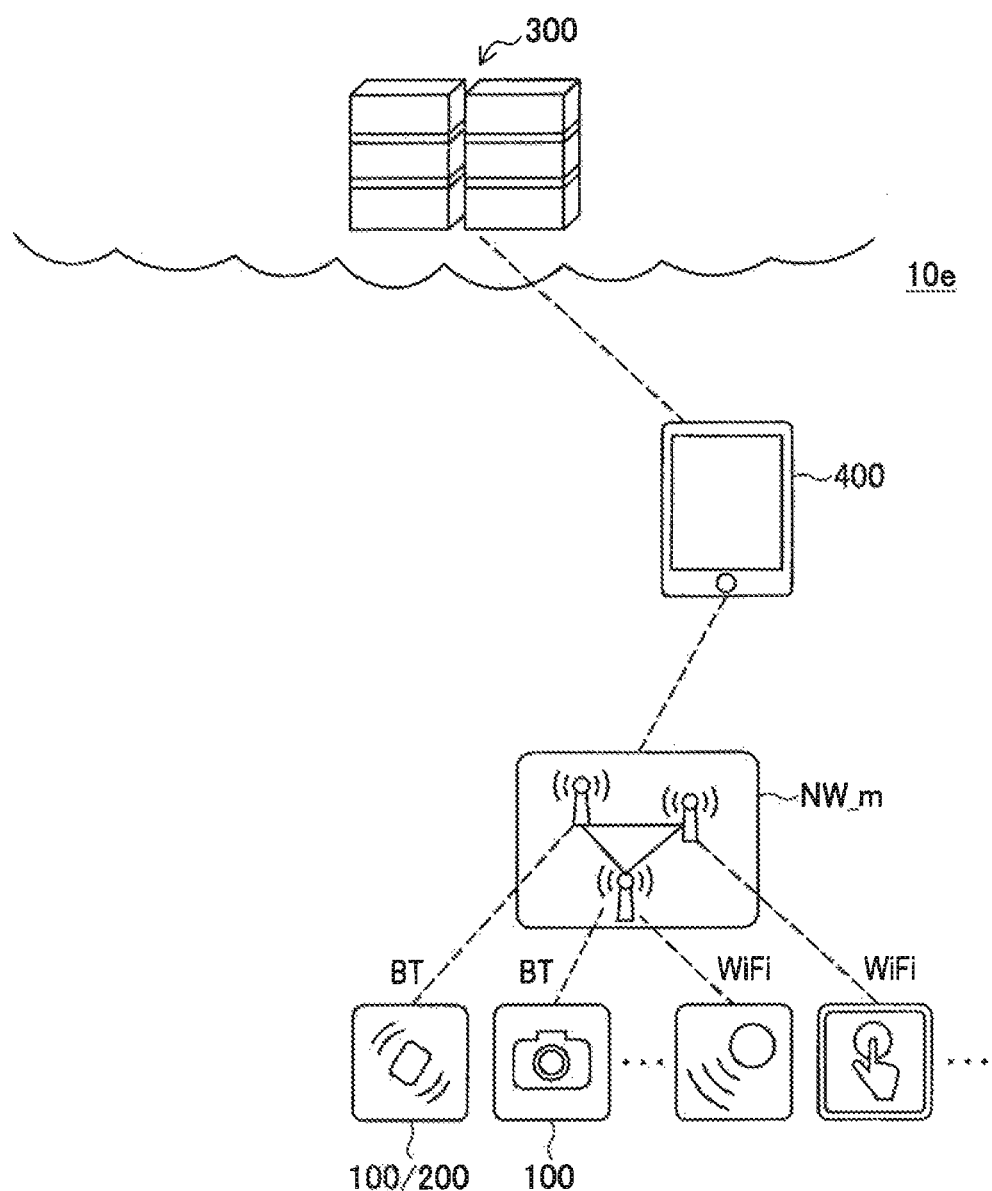
FIG. 6 is a diagram illustrating an example of a fifth specific configuration of the system illustrated in FIG. 1.

FIG. 6 is a diagram illustrating a fifth example of a specific configuration of the system illustrated in FIG. 1. Referring to FIG. 6, a system 10e includes elements 100, at least one of which functions as a manager 200, a tablet functioning as a UI device 400, and a server 300. The system 10e is an example in which the manager 200 of the system 10c of the third example described above is incorporated into any element 100.

Sixth Example

Figure 7:
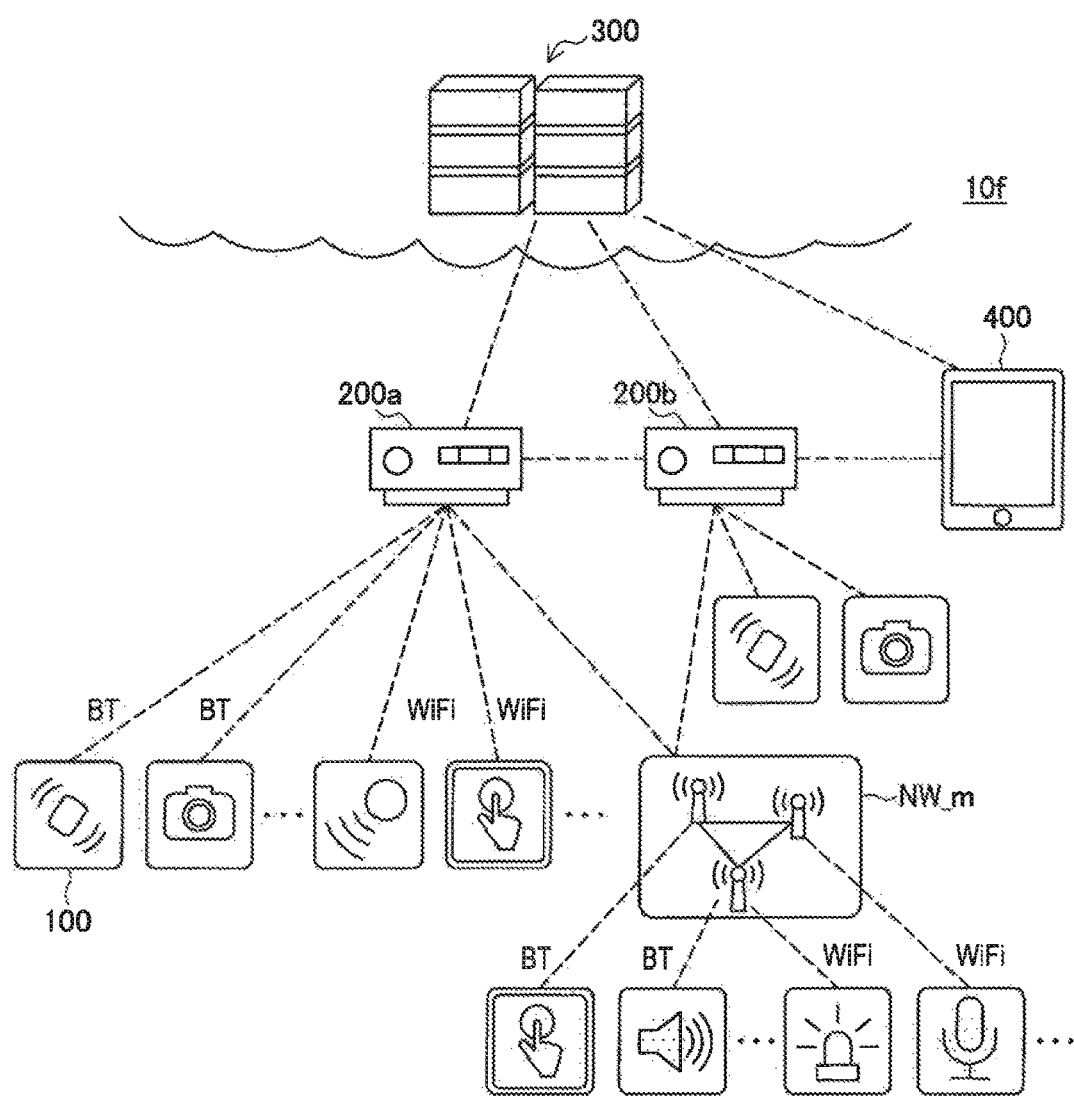
FIG. 7 is a diagram illustrating an example of a sixth specific configuration of the system illustrated in FIG. 1.

FIG. 7 is a diagram illustrating a sixth example of a specific configuration of the system illustrated in FIG. 1. Referring to FIG. 7, a system 10f includes elements 100, managers 200a and 200b, a tablet functioning as a UI device 400, and a server 300. The system 10f is an example in which a plurality of managers 200 are arranged in the system 10c in the third example described above. Each of the elements 100 can be connected to, for example, one of the managers 200a and 200b located closer thereto. In addition, the plurality of managers 200a and 200b synchronize a connection state of the elements 100 or a program for causing the elements 100 to perform a linked operation with each other if necessary or periodically.

Seventh Example

Figure 8:
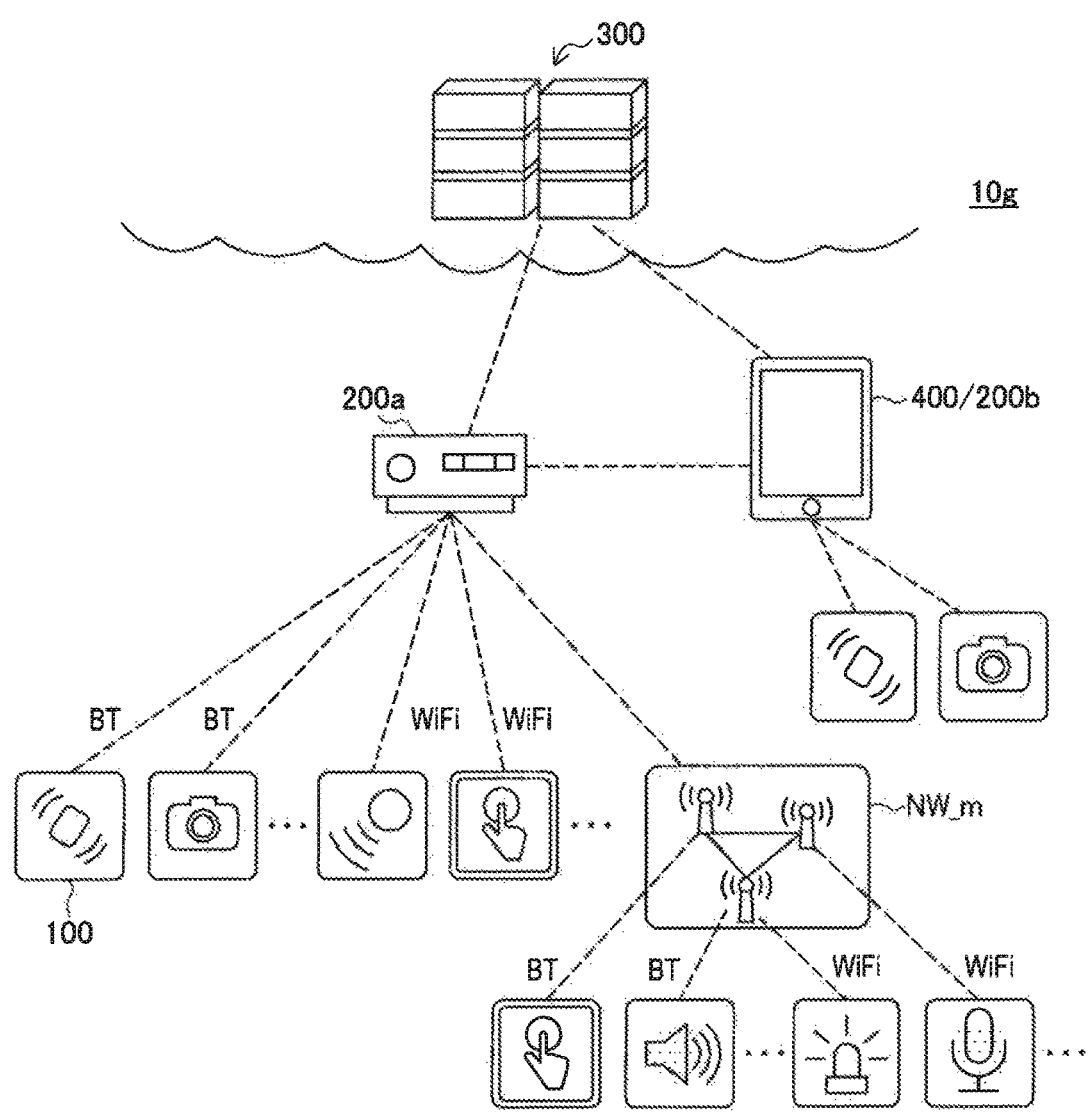
FIG. 8 is a diagram illustrating an example of a seventh specific configuration of the system illustrated in FIG. 1.

FIG. 8 is a diagram illustrating a seventh example of a specific configuration of the system illustrated in FIG. 1. Referring to FIG. 8, a system 10g includes elements 100, a manager 200a, a tablet functioning as a manager 200b and a UI device 400, and a server 300. The system 10g is an example in which the function of the manager 200b is integrated with the tablet of the system 10f in the sixth example described above. Each of the elements 100 can be connected to, for example, either the manager 200a or the tablet that is located closer thereto. In addition, the manager 200a and the tablet synchronize a connection state of the elements 100 or a program for causing the elements 100 to perform a linked operation with each other if necessary or periodically.

Eighth Example

Figure 9:
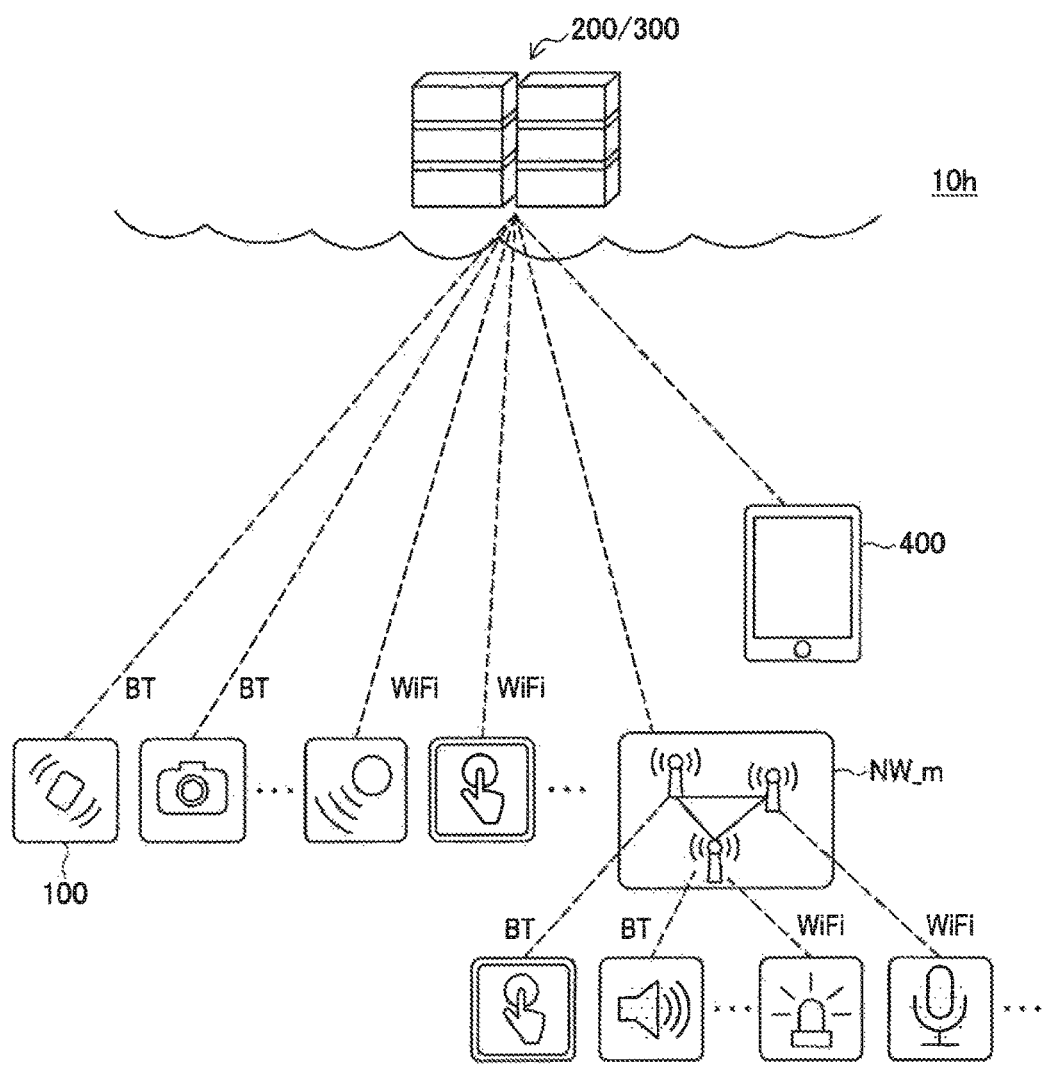
FIG. 9 is a diagram illustrating an example of an eighth specific configuration of the system illustrated in FIG. 1.

FIG. 9 is a diagram illustrating an eighth example of a specific configuration of the system illustrated in FIG. 1. Referring to FIG. 9, a system 10h includes elements 100, a tablet functioning as a UI device 400, and a server 300 functioning also as a manager 200. The system 10h is an example in which the function of the manager 200 is incorporated into the server 300 of the system 10b in the second example described above. Each of the elements 100 communicates directly with the server 300 via, for example, a mobile communication network.

The several examples of the specific configuration of the system 10 illustrated in FIG. 1 have been described above. Note that examples of the specific configuration of the system 10 are not limited to the examples described above, and various modified examples that are clearly understood by persons skilled in the art based on these examples can be included.

1-3. Example of User Interface

Figure 10:
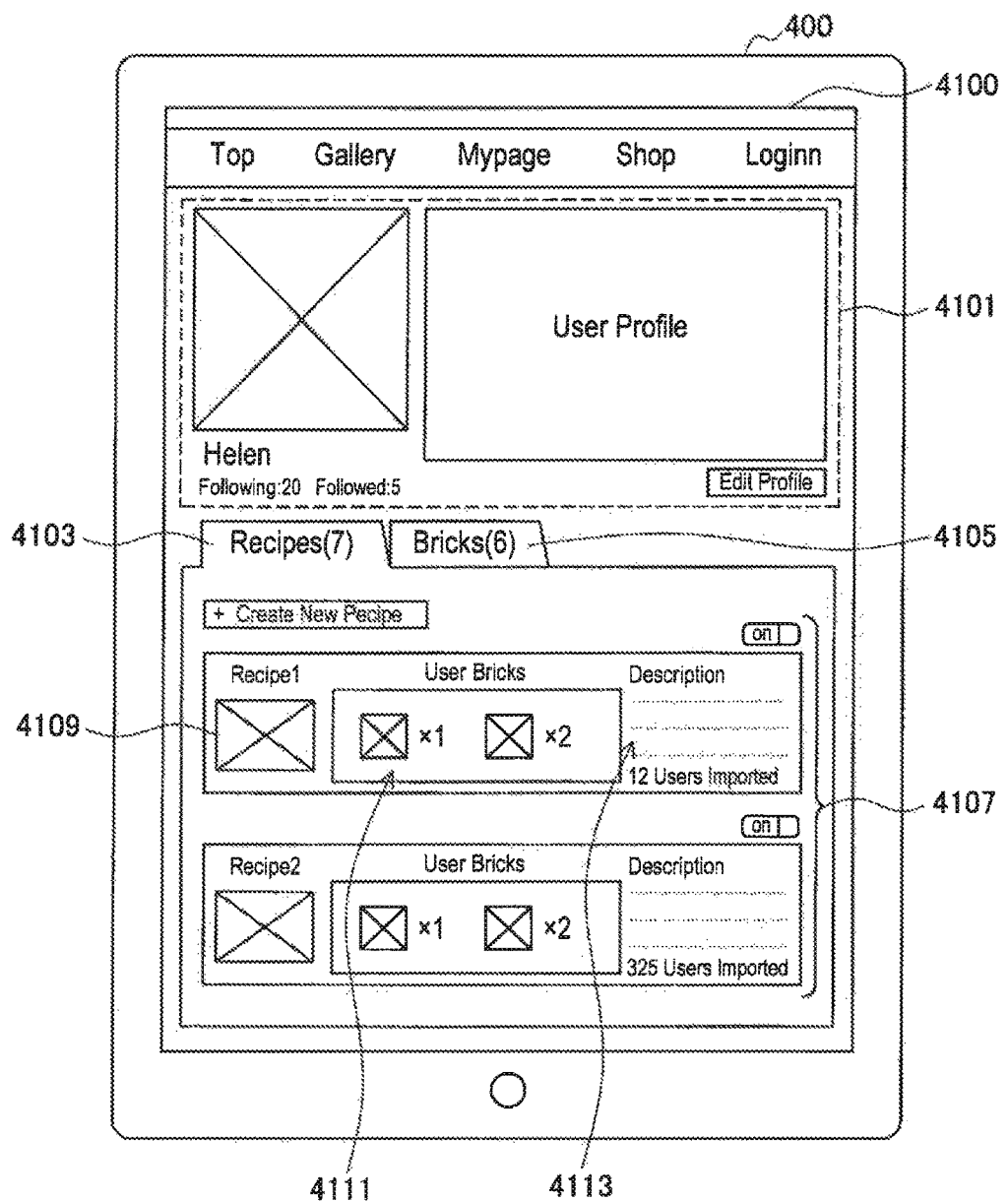
FIG. 10 is a diagram illustrating a first example of a UI provided in the system illustrated in FIG. 1.

FIG. 10 is a diagram illustrating a first example of a UI provided in the system illustrated in FIG. 1. Referring to FIG. 10, a screen 4100 displayed on a display of a terminal device that functions as the UI device 400 includes a user profile 4101, a program list tab 4103, and an element list tab 4105. In the illustrated example, because the program list tab 4103 has been selected, a program list 4107 is displayed. The program list 4107 includes a program icon 4109, a use element icon 4111, and a description 4113. The screen 4100 can be displayed as, for example, a portal screen when a user uses services that the system 10 provides.

Figure 11:
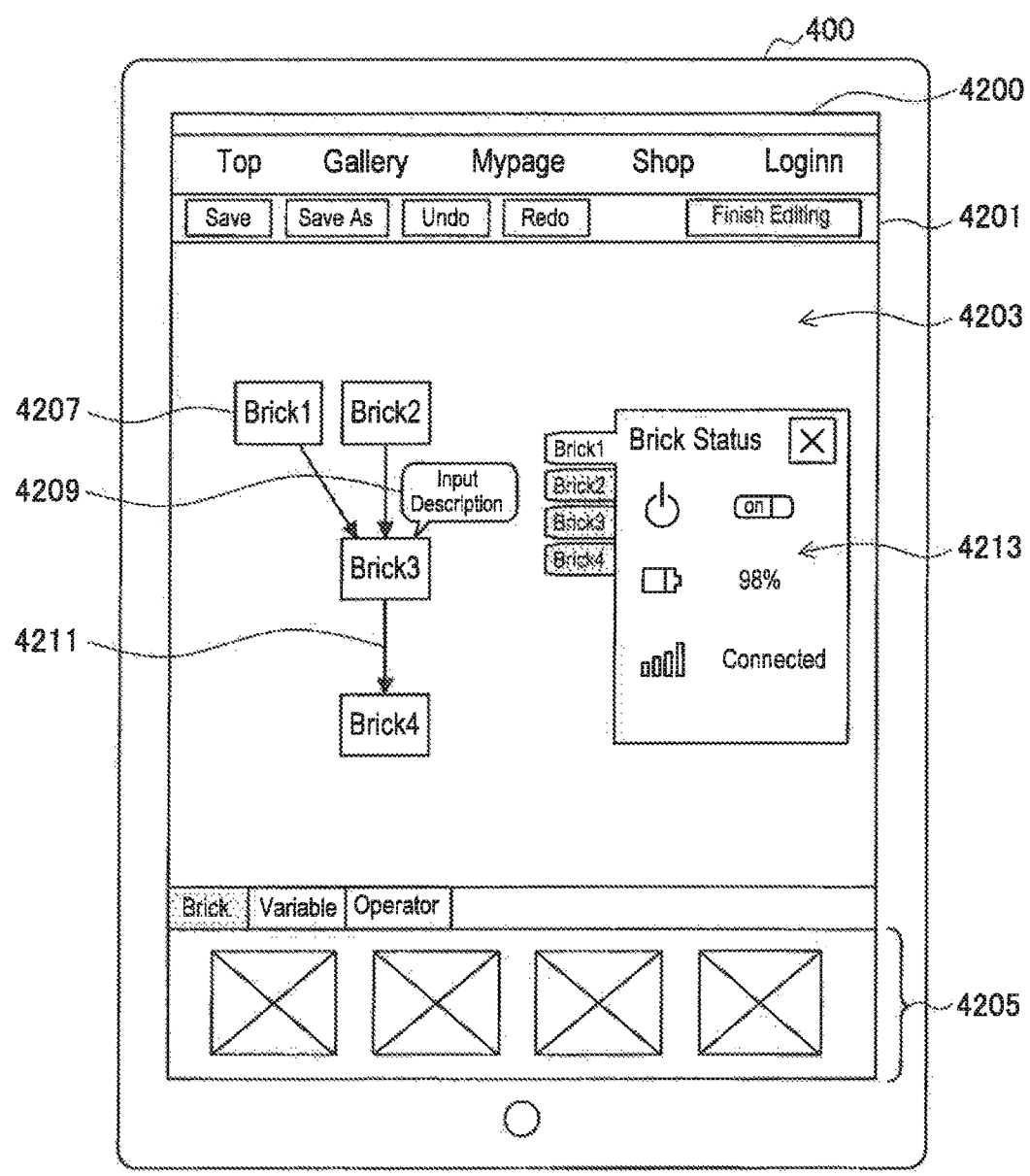
FIG. 11 is a diagram illustrating a second example of a UI provided in the system illustrated in FIG. 1.

FIG. 11 is a diagram illustrating a second example of the UI provided in the system illustrated in FIG. 1. Referring to FIG. 11, a screen 4200 displayed on a display of the terminal device functioning as the UI device 400 includes a tool bar 4201, a canvas 4203, and a tray 4205. The screen 4200 is used in, for example, editing of a program for causing elements 100 to perform a linked operation in the system 10. The tool bar 4201 has function buttons arranged therein, such as "save," or "redo." The canvas 4203 has element icons 4207, detailed information icons 4209, and links 4211 that can be arranged or drawn therein. These icons and links enable the elements 100 to be used in a linked operation, a process executed by each of the elements 100, and a relation between the elements 100 to be set and checked. Furthermore, the canvas 4203 has an element property box 4213 arranged therein to display, for example, attributes and states of an element 100 arranged as an element icon 4207. The tray 4205 displays, as an icon, an element 100, software, or the like that is arranged in the canvas 4203 to be incorporated into a program.

Note that the UIs described with reference to FIGS. 10 and 11 are mere examples, and UIs in various forms can be provided in the present embodiment. For example, various UIs used on screens for visual programming can be applied on the screen for editing the program described with reference to FIG. 11.

1-4. Example of Linked Operation

Specific examples of linked operations of elements in the system illustrated in FIG. 1 will be described below. Note that, for the sake of easy understanding, diagrams visually expressing programs for causing the elements 100 to perform linked operations will be referred to in description below. Note that these drawings are not necessarily related to a UI provided by the UI device 400 (for example, a UI illustrated as the screen 4200 in FIG. 11). Software to be described below may be provided as an element (a software element) similar to the elements 100 (hardware elements), and may be provided as at least one of functions or operations of the elements 100.

First Specific Example

Figure 12:
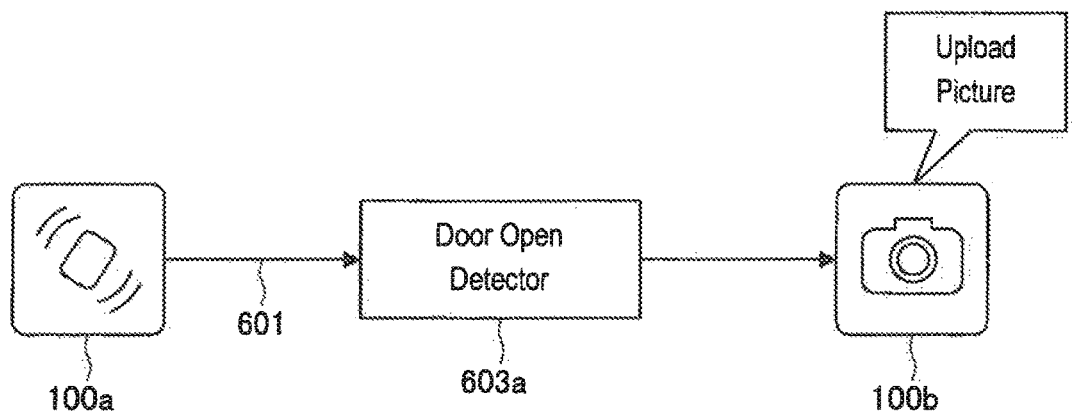
FIG. 12 is a diagram for describing a first specific example of a linked operation of elements in the system illustrated in FIG. 1.

FIG. 12 is a diagram for describing a first specific example of a linked operation of elements in the system illustrated in FIG. 1. Referring to FIG. 12, among the elements 100, the acceleration sensor 100a and the camera 100b are used in the present example. The acceleration sensor 100a is installed in a door of a refrigerator, and the camera 100b is installed at a position at which the inside of a cabinet of the refrigerator can be projected. In the illustrated example, a link 601 from the acceleration sensor 100a to the camera 100b indicates that "the camera 100b executes photographing based on a detection value of the acceleration sensor 100a." Furthermore, in the illustrated example, "uploading a photographed image on a server" is designated as an operation of the camera 100b.

Furthermore, in the illustrated example, software 603a for detecting the fact that the door is opened based on acceleration is used. The software 603a is executed by, for example, the computing unit 221 of the manager 200, and determines that the door of the refrigerator is opened based on a result of analysis of a detection value of the acceleration sensor 100a. By employing the software 603a, the link 601 indicates a process in which, "when the door of the refrigerator is determined to be opened based on a detection value of the acceleration sensor 100a, the camera 100b executes photographing."

Under the setting of the program described above, an image photographed by the camera 100b when the door of the refrigerator is opened is uploaded on the server. Viewing the uploaded image, a user can ascertain a change in the contents of the refrigerator or its latest storage state.

Here, if opening of the door of the refrigerator is desired to be detected, a sensor dedicated to opening/closing detection using magnetism or the like can also be used. However, in the present example, opening of the door can be detected using the acceleration sensor 100a by employing the software 603a. Thus, in order to detect the fact that the door of the refrigerator has been opened, for example, the acceleration sensor 100a which has been used for other applications up to that point can be utilized, rather than using a dedicated sensor. In addition, when it is no longer necessary to detect that the door of the refrigerator has been opened, an application of the acceleration sensor 100a can be used for another purpose. In this way, the same element 100 can be utilized for various applications by changing a combination with the software or another element 100 in the present embodiment.

Second Specific Example

Figure 13:
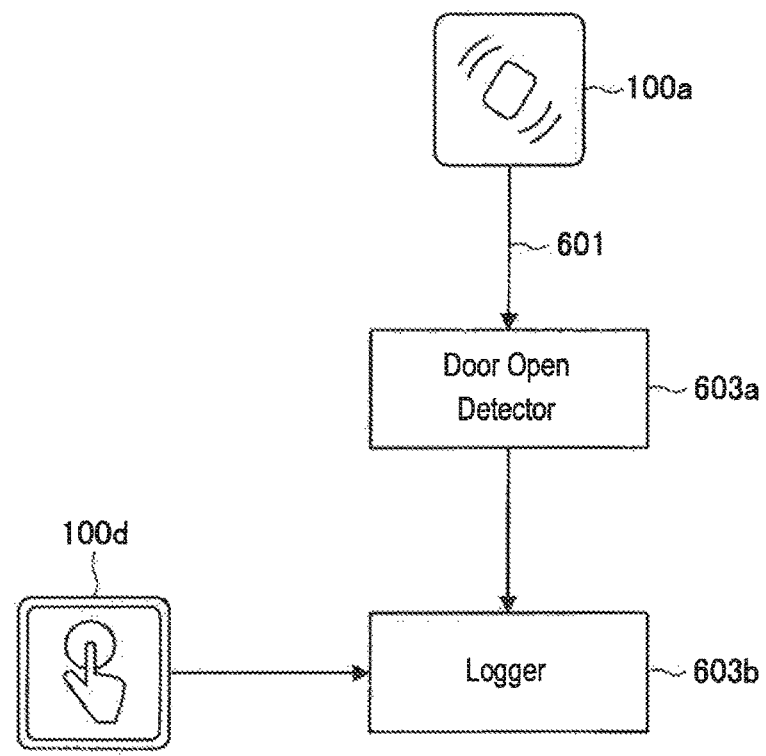
FIG. 13 is a diagram for describing a second specific example of a linked operation of elements in the system illustrated in FIG. 1.

FIG. 13 is a diagram for describing a second specific example of a linked operation of elements in the system illustrated in FIG. 1. Referring to FIG. 13, the acceleration sensor 100a and the button 100d among the elements 100 are used in the present example. For example, the acceleration sensor 100a is installed in the door of a bathroom, and the button 100d is installed in a washroom. In the illustrated example, the software 603a for detecting opening of the door based on acceleration and software 603b which records provided data are also used. A link 601 from the acceleration sensor 100a to the software 603b via the software 603a indicates that "the software 603b records a determination that the door has been opened made based on a detection value of the acceleration sensor 100a." In addition, another link 601 from the button 100d to the software 603b indicates that "the software 603b records an output of a signal from the button 100d."

Under the setting of the program described above, times at which a user presses the button 100d in the washroom and times at which the door of the bathroom has been opened can be recorded as logs in the present example. For example, if a user routinely presses the button 100d when he or she washes his or her face in the washroom after waking up, the time at which the button 100d is pressed can be recorded as his or her wakeup time. With such logs, for example, changes in everyday wakeup times and times at which the user goes to the bathroom can be reviewed in a time series manner, which will eventually be helpful for improving the user's daily rhythm.

Third Specific Example

Figure 14:
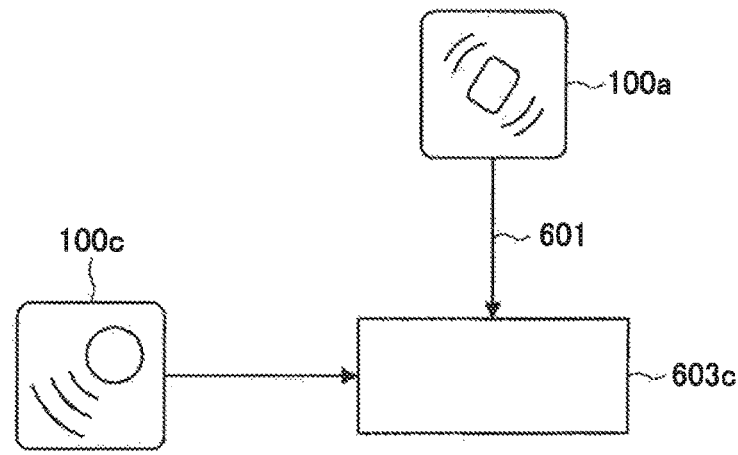
FIG. 14 is a diagram for describing a third specific example of a linked operation of elements in the system illustrated in FIG. 1.

FIG. 14 is a diagram for describing a third specific example of a linked operation of elements in the system illustrated in FIG. 1. Referring to FIG. 14, among the elements 100, the acceleration sensor 100a and the human sensor 100c are used in the present example. For example, the acceleration sensor 100a is installed in a chair, and the human sensor 100c is installed in a desk in front of the chair. In the illustrated drawing, software 603c for recording lengths of time for which a user has been sitting on the chair based on results of detection of the acceleration sensor 100a and the human sensor 100c is further used. A link 601 from the acceleration sensor 100a to the software 603c indicates that "a detection value of the acceleration sensor 100a is provided to the software 603c." In addition, another link 601 from the human sensor 100c to the software 603c indicates that "a detection value of the human sensor 100c is provided to the software 603c."

Under the setting of the program described above, lengths of time for which the user has been sitting on the chair are recorded in the present example. Based on this record, the user can ascertain a length of time for which he or she has been sitting at his or her workplace or the like, and can take a break if the length of time for which he or she has been continuously sitting is too long. Alternatively, when software that outputs alerts from a smartphone or the like based on a result of detection of the software 603c is further incorporated, and a user has been continuously sitting for over a predetermined period of time, the user may receive an output of an alert from the smartphone or the like to be urged to take a break.

Fourth Specific Example

Figure 15:
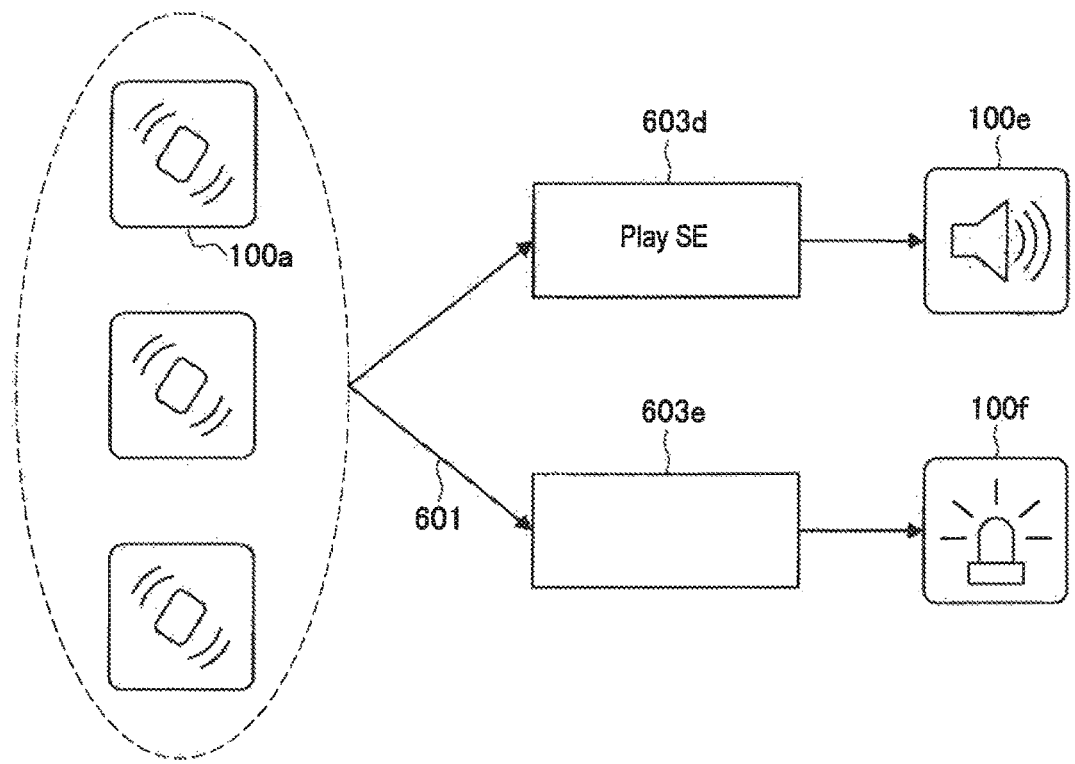
FIG. 15 is a diagram for describing a fourth specific example of a linked operation of elements in the system illustrated in FIG. 1.

FIG. 15 is a diagram for describing a fourth specific example of a linked operation of elements in the system illustrated in FIG. 1. Referring to FIG. 15, the acceleration sensor 100a, the speaker 100e, and the LED lamp 100f among the elements 100 are used in the present example. The acceleration sensor 100a, the speaker 100e, the LED lamp 100f are, for example, each installed in a proper spot on the body of a user (for example, a child). Note that a plurality of acceleration sensors 100a may be used. In the illustrated example, software 603d which reproduces sound effects according to acceleration patterns and software 603e which causes the lamp to blink in predetermined patterns likewise according to the acceleration patterns are shown. Note that the acceleration patterns to which the software 603 responds may be patterns having a single acceleration waveform, or may be patterns in combinations of a plurality of acceleration waveforms. Links 601 from the acceleration sensors 100a to each of the pieces of software 603d and 603e are set. These links 601 indicate that "detection values of the acceleration sensors 100a are provided to each of the pieces of software 603d and 603e." Furthermore, links 601 are set from the software 603d to the speaker 100e, and from the software 603e to the LED lamp 100f. These links 601 indicate that "the speaker 100e outputs a sound according to a sound signal provided by the software 603d" and "the LED lamp 100f emits light according to a signal provided by the software 603e."

Under the setting of the program described above, if the user (for example, a child) moves his or her hand and foot in a specific pattern, sound effects are output from the speaker 100e, or light is emitted from the LED lamp 100f in the present example. Thus, when a child plays make believe that he or she is a superhero, for example, he or she can have an exciting experience with sound effects and light added.

Fifth Specific Example

Figure 16:
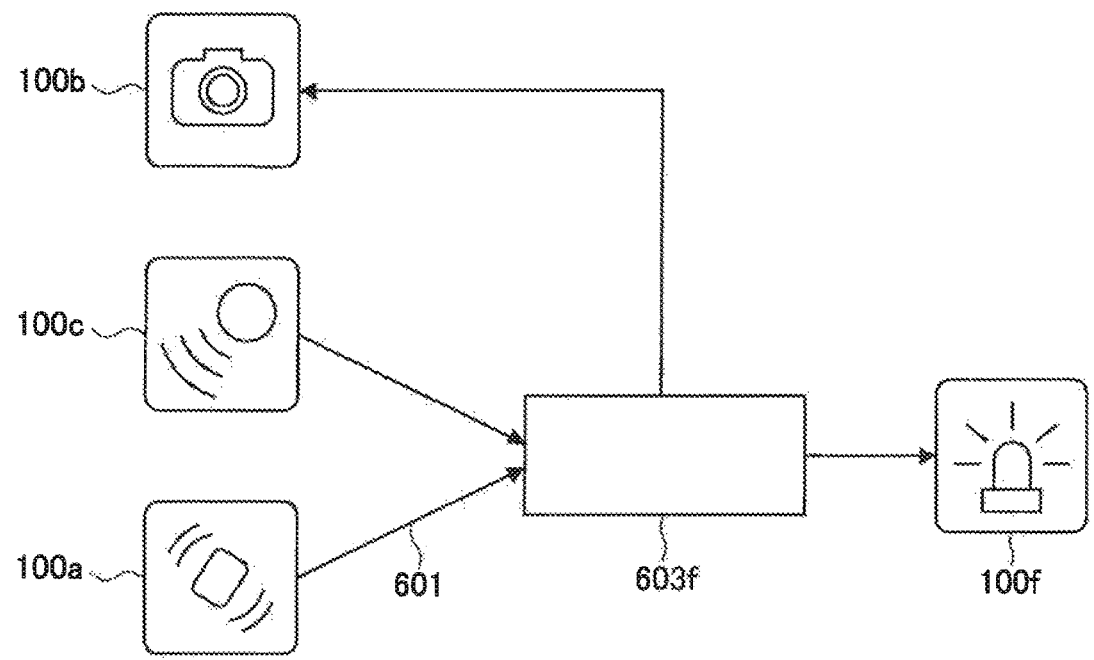
FIG. 16 is a diagram for describing a fifth specific example of a linked operation of elements in the system illustrated in FIG. 1.

FIG. 16 is a diagram for describing a fifth specific example of a linked operation of elements in the system illustrated in FIG. 1. Referring to FIG. 16, among the elements 100, the acceleration sensor 100a, the human sensor 100c, the camera 100b, and the LED lamp 100f are used in the present example. For example, the acceleration sensor 100a, the human sensor 100c, and the camera 100b are installed on a feeding table (a bird table) in a garden, and the LED lamp 100f is installed inside a house. In the illustrated example, software 603f for determining that a bird has stopped at the feeding table based on a result of detection by the acceleration sensor 100a and the human sensor 100c is shown. Links 601 from the acceleration sensor 100a and the human sensor 100c to the software 603f are set. The link 601 from the acceleration sensor 100a indicates that "a detection value of the acceleration sensor 100a is provided to the software 603f." In addition, the link 601 from the human sensor 100c indicates that "a detection value of the human sensor 100c is provided to the software 603f." For example, a condition that is satisfied based on a combination of sensor data provided from the acceleration sensor 100a and the human sensor 100c is provided to the software 603f. Furthermore, links 601 from the software 603f to the camera 100b and the LED lamp 100f are set. The link 601 to the camera 100b indicates that "the camera 100b executes photographing based on an output of the software 603f." The link to the LED lamp 100f indicates that "the LED lamp 100f is caused to emit light based on an output of the software 603f."

Under the setting of the program described above, a still image or a dynamic image can be automatically photographed by the camera 100b when a bird has stopped at the feeding table, and the kind of bird that has come can be identified. In addition, because the LED lamp 100f emits light inside the house when a bird has stopped at the feeding table, a user can go out to the garden to directly observe the bird that has come.

Sixth Specific Example

Figure 17:
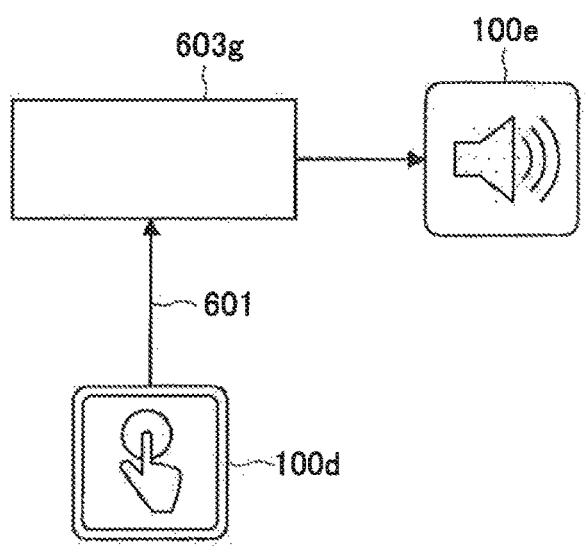
FIG. 17 is a diagram for describing a sixth specific example of a linked operation of elements in the system illustrated in FIG. 1.

FIG. 17 is a diagram for describing a sixth specific example of a linked operation of elements in the system illustrated in FIG. 1. Referring to FIG. 17, among the elements 100, the button 100d and the speaker 100e are used in the present example. For example, the speaker 100e is installed in a bedroom, and the button 100d is installed in a washroom. In the illustrated example, software 603g for a wakeup alarm is further shown. A link 601 is set from the software 603g to the speaker 100e. This link 601 indicates that "the speaker 100e outputs a sound according to a sound signal output by the software 603 at a set time." In addition, another link 601 is set from the button 100d to the software 603g. This link 601 indicates that, "if the button 100d is pressed, an output of sound signals from the software 603g stops."

Under the setting of the program described above, a sound of the wakeup alarm output from the speaker 100e placed in the bedroom will not stop until the button 100d in the washroom is pressed. Thus, cases in which a user turns off the alarm without waking up are less likely to occur, and the user can reliably wake up at an intended time.

2. Embodiments of Present Disclosure

Embodiments of the present disclosure relate to a user interface for creating, editing, or viewing a program for causing elements to perform a linked operation in, for example, the system as described in the above examples. Note that, although the system 10 described with reference to FIG. 1 and the like will be described as an example below, a system according to an embodiment of the present disclosure is not limited thereto, and the present technology can be applied to systems in various forms in which elements perform linked operations.

In the system 10 described above, a user interface with regard to a linked operation of elements is provided via a display included in the input/output unit 430 of the UI device 400, or the like. In this case, the control unit 420 of the UI device 400 can be said to function as a display control unit which causes the display to display the user interface.

In addition, when the control unit 220 of the manager 200 and/or the control unit 320 of the server 300 transmit information for causing the UI device 400 to display the user interface via the communication unit 210 and/or the communication unit 310, the control unit 220 and/or the control unit 320 can be said to function as display control units which cause the display of the UI device 400 to display the user interface.

Furthermore, when the input/output unit 430 of the UI device 400 acquires a user operation via a touch panel or the like, the control unit 420, the control unit 220, and/or the control unit 320 can also be said to function as operation acquisition units which acquire user operations.

Processes of providing the user interface and acquiring user operations to be described below are executed by the above-described display control units and operation acquisition units.

2-1. First Embodiment (Overview of User Interface)

Figure 18:
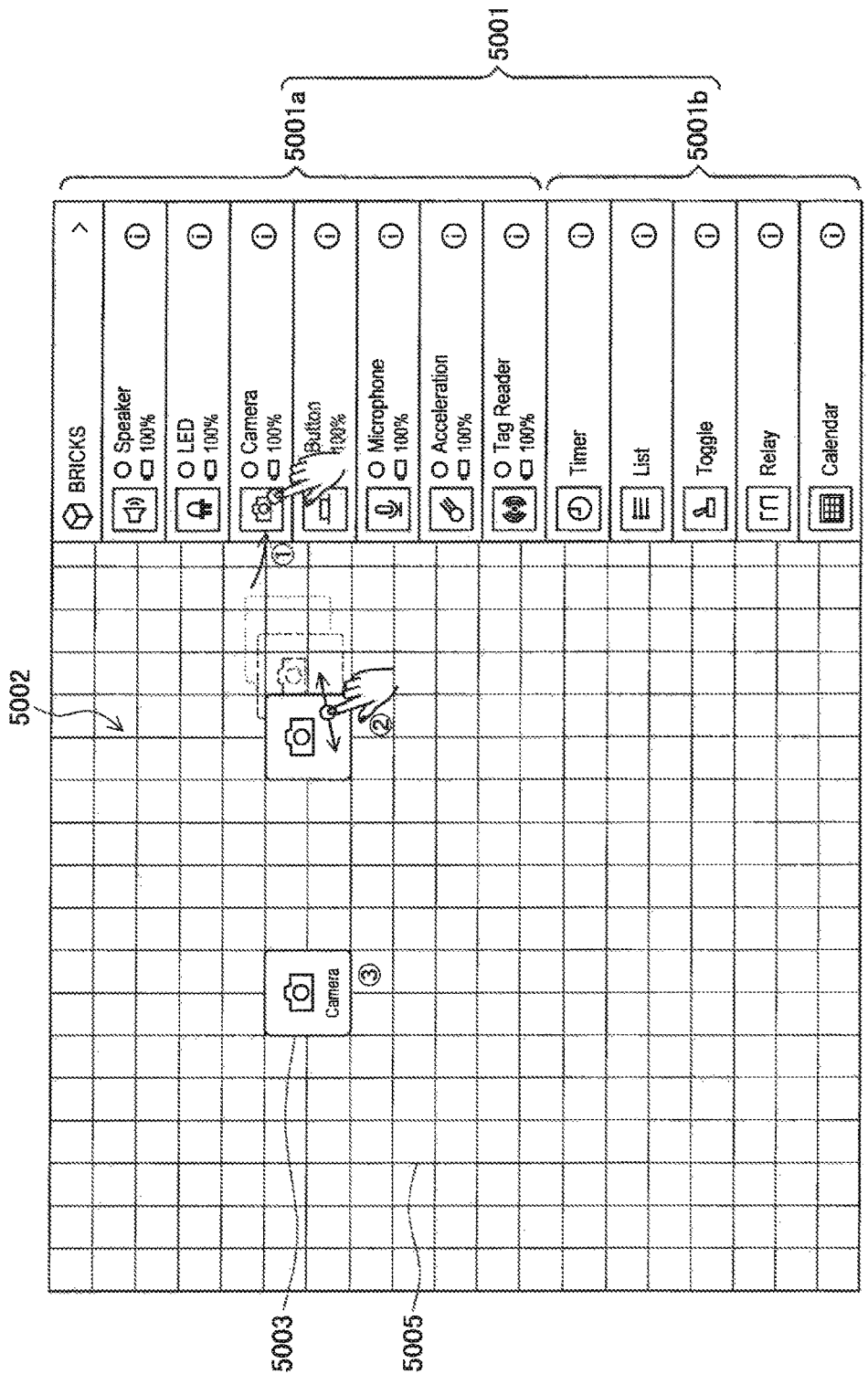
FIG. 18 is a diagram illustrating an overview of a user interface provided in a first embodiment of the present disclosure.

FIG. 18 is a diagram illustrating an overview of a user interface provided in a first embodiment of the present disclosure. Referring to FIG. 18, a screen 5000 displayed on a display as a user interface includes a list 5001, a field 5002, an element icon 5003, and grid lines 5005.

The list 5001 displays a list of icons indicating elements that can be used in the system 10. In the illustrated example, the list 5001 includes a hardware element list 5001a and a software element list 5001b.

The hardware element list 5001a displays elements realized as hardware, for example, a speaker, an LED lamp, a camera, a button, a microphone, an acceleration sensor, and a tag reader. These elements 100 (the acceleration sensor 100a, the camera 100b, the human sensor 100c, the button 100d, the speaker 100e, the LED lamp 100f, and the microphone 100g) of the system 10 exemplified in the above description are all hardware elements.

The software element list 5001b displays elements realized as software, for example, a timer, a list adder, a toggle, a relay, and a calendar. The software 603 described in the specific examples above with reference to FIGS. 12 to 17 can correspond to the software elements mentioned above. Software elements can have a variety of configurations, and a condition set for a hardware element, for example, may be treated as a separate software element, or the condition may be defined in the hardware elements.

Note that the list 5001 is merely an example of a configuration for disposing a new element icon 5003 on the field. For example, even when the list 5001 is not displayed, a pop-up window or the like for disposing the new element icon 5003 may be displayed by executing a predetermined operation on the field 5002, for example, tapping, clicking, or the like.

The element icon 5003 indicates a hardware element or a software element described above. In the illustrated example, first, an arbitrary element is selected from the list 5001, the element icon 5003 is then caused to appear on the field 5002 by dragging a line of the list, and then it is moved to a desired position as indicated by numbers. At this time, the display of the grid lines 5005 makes it easy to align or displace positions of a plurality of element icons 5003. The element icon 5003 may be automatically aligned with the grid lines 5005.

Here, the grid lines 5005 are displayed in a first direction (a horizontal direction) defined in the field 5002 where the element icon 5003 is disposed and a second direction (a vertical direction) intersecting the first direction. Note that, since the grid lines 5005 are displayed to assist a user with disposing the element icon 5003 on the screen 5000, they may not necessarily be displayed.

(Examples of Operation Icons)

Figure 19A:
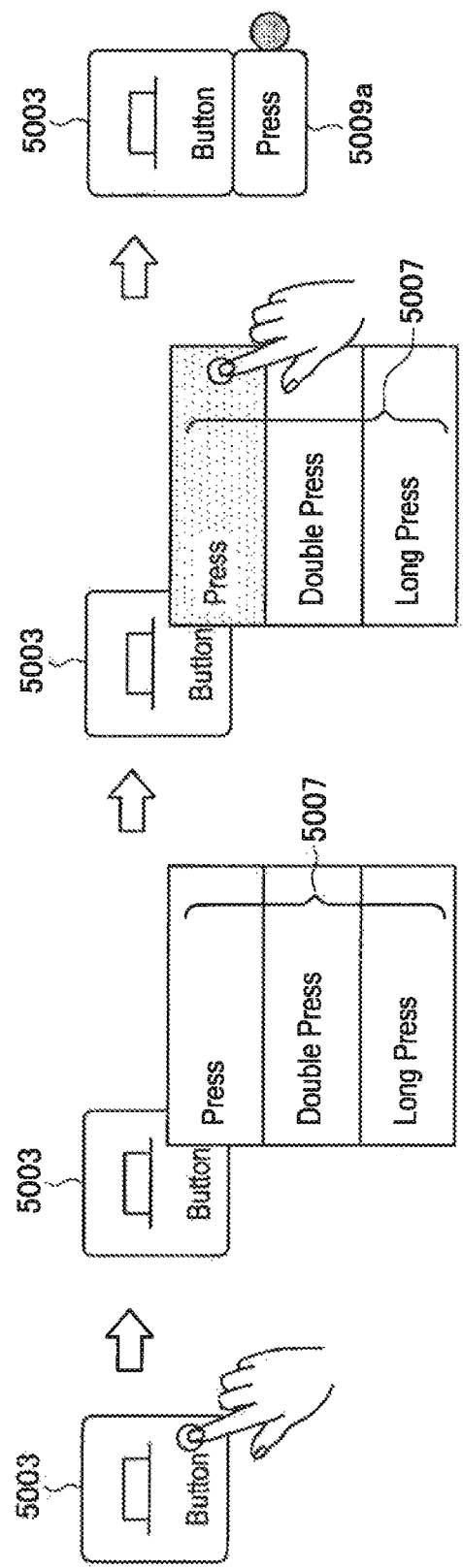
FIG. 19A is a diagram for describing operation icons displayed in the first embodiment of the present disclosure.

FIGS. 19A and 19B are diagrams for describing operation icons displayed in the first embodiment of the present disclosure. Referring to FIG. 19A, first, the element icon 5003 is selected in a state in which only the element icon 5003 is displayed (although the icon is selected through a touch operation in the illustrated example, it may be selected using a mouse cursor or the like, and the same applies to the following examples), and an operation list 5007 is displayed according to this selection. If an arbitrary operation is selected from the operation list 5007 ("Press" is selected in the illustrated example), an operation icon 5009a is displayed in association with the element icon 5003.

In FIG. 19B, in the state in which the operation icon 5009a is displayed in association with the element icon 5003 through the operation illustrated in FIG. 19A, for example, the element icon 5003 is further selected. In this case, the operation list 5007 is displayed again. If another arbitrary operation is selected from the operation list 5007 ("Double Press" is selected in the illustrated example), a new operation icon 5009b is displayed in association with the operation icon 5009a.

In the illustrated example, the element icon 5003 indicating the type of hardware element or software element (which indicates that the element is the button 100d in the illustrated example) is displayed along with the operation icons 5009 indicating the type of operation of the element (which indicates the operation in which the button 100d is pressed in the illustrated example). In this case, icons disposed in the field 5002 on the screen 5000 can include the element icon 5003 and the operation icons 5009. In addition, as illustrated in FIG. 19B, in particular, the operation icons 5009 can include the plurality of operation icons 5009a and 5009b indicating a plurality of operations that occur independently. Three or more operation icons may be included.

(Example of Setting of Link)

FIG. 20 is a diagram for describing a setting of a link between icons in the first embodiment of the present disclosure. In the example illustrated in FIG. 20, an element icon 5003a indicating the button 100d, and an element icon 5003b indicating the camera 100b are disposed in the field 5002. In addition, an operation icon 5009a indicating "Press" associated with the element icon 5003a, and an operation icon 5009c indicating "Take Photo" associated with the element icon 5003b are displayed. Furthermore, in the illustrated example, socket icons 5011 are displayed in association with the operation icons 5009. The socket icons 5011 are displayed as portions to which the link 5015 to be described below is connected.

Here, a socket icon 5011a is disposed on only a side (the right side) of the operation icon 5009a associated with the element icon 5003a (indicating the button 100d) in the first direction (the horizontal direction) defined in the field 5002. This means that the operation displayed as the operation icon 5009a (pressing the button) is solely used as a trigger for an operation by another element. Conversely, the operation displayed as the operation icon 5009a (pressing the button) is not a function triggered by an operation of another element. Such an operation icon 5009a is also called a terminal icon. In addition, when all of the operation icons 5009 associated with the element icon 5003a are terminal icons as in the illustrated example, an entirety including the element icon 5003a and an operation icon 5009a may be called a terminal icon.

On the other hand, socket icons 5011b are disposed on both sides (the left and right sides) of the operation icon 5009c associated with the element icon 5003b (indicating the camera 100b) in the first direction (the horizontal direction) defined in the field 5002. The operation displayed as the operation icon 5009c (photographing) can be a function triggered by an operation of another element for execution, or may be used as a trigger for an operation of another element. That is, photographing by the camera 100b displayed as the operation icon 5009c can be executed with an operation of pressing the button 100d displayed as the operation icon 5009a as a trigger, and an operation of another element can also be executed with execution of photographing by the camera 100b as a trigger as in the illustrated example. The operation icon 5009c, or an entirety including the element icon 5003b and the operation icon 5009c is also called an intermediate icon.

As in the illustrated example, as the terminal icon and the intermediate icon are expressed with disposition of the socket icons 5011, for example, an element or an operation used as either a trigger or a function executed by a trigger, and an element or an operation used as both a trigger and a function can be displayed on the screen 5000 to be easily understood.

In the example illustrated in FIG. 20, the socket icon 5011a displayed along with the element icon 5003a and the operation icon 5009a is selected, and a plug icon 5013 and the link 5015 are drawn out from the socket icon 5011a according to the selection. By dragging the plug icon 5013 and inserting it into a socket icon 5011b, a user can generate the link 5015 connecting the operation icon 5009a and the operation icon 5009c.

Note that, when dragging of the plug icon 5013 is released in a state in which the plug icon 5013 is not inserted into the socket icon 5011, the link 5015 may disappear along with the plug icon 5013. In this case, the link 5015 may disappear along with the plug icon 5013 when, for example, the socket icon 5011b is selected, the plug icon 5013 is drawn out, the plug icon 5013 is dragged, and then the dragging is released in a state in which the plug icon is separated from the socket icon 5011b.

As described so far, a plurality of icons indicating elements performing a linked operation and a link connecting these icons are displayed in the user interface provided in the present embodiment. That is, the elements indicated as the plurality of icons connected by the link perform a linked operation. In the example illustrated in FIG. 20, when a pressing operation indicated by the operation icon 5009a occurs at the button 100d indicated by the element icon 5003a, photographing indicated by the operation icon 5009c is executed by the camera 100b indicated by the element icon 5003b. The link 5015 expresses such a linked operation of these elements.

Here, an order of a linked operation performed between elements is decided according to, for example, a positional relation of the element icons 5003 in the first direction (the horizontal direction) defined in the field 5002. In the horizontal direction in the illustrated example, positions on the left side are earlier in order, and positions on the right side are later in order. Based on this criterion, when an operation of the button 100d indicated by the element icon 5003a occurs, occurrence of an operation of the camera 100b indicated by the element icon 5003b can be specified accordingly. In this manner, for example, a special sequence of the plurality of icons formed by the link 5015 corresponds to a temporal sequence of operations of the elements indicated by the plurality of icons in the present embodiment.

(Example of Deletion of Operation Icon)

Figure 21:
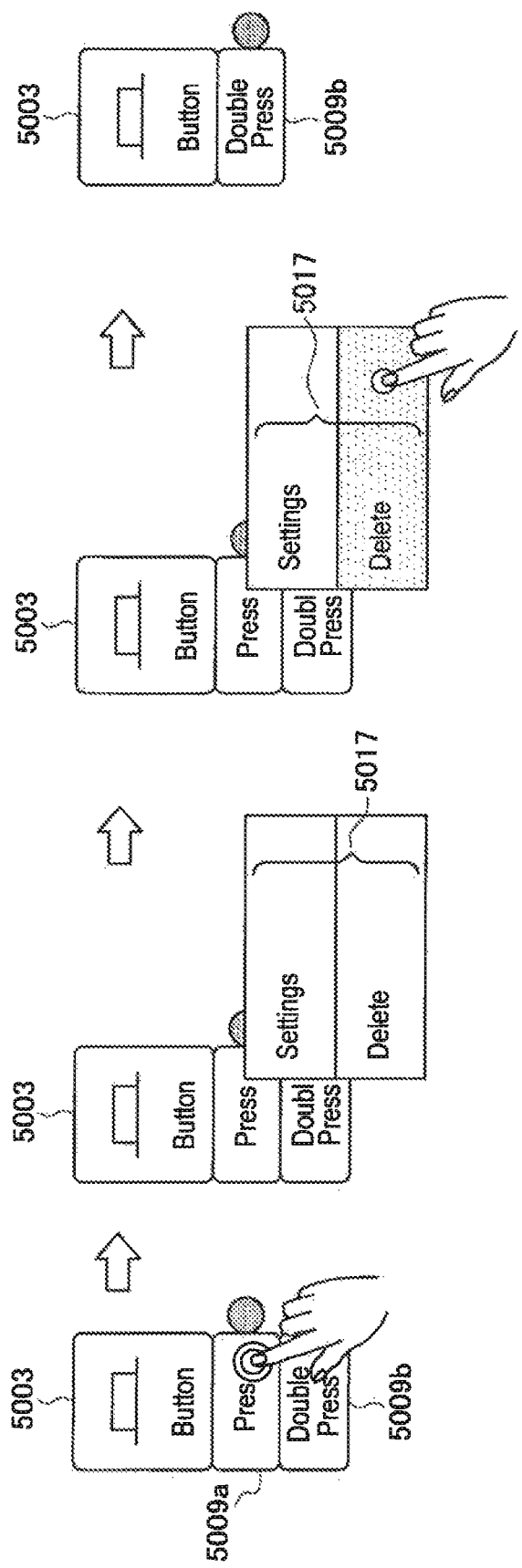
FIG. 21 is a diagram for describing deletion of an operation icon in the first embodiment of the present disclosure.

FIG. 21 is a diagram for describing deletion of an operation icon in the first embodiment of the present disclosure. Referring to FIG. 21, the element icon 5003, and the operation icons 5009a and 5009b associated with the element icon 5003 are displayed through the operation illustrated in, for example, FIG. 19B. If the operation icon 5009a is selected in this state, an operation setting list 5017 is displayed. In the illustrated example, the operation setting list 5017 includes options including setting and deletion.

Here, if a user selects deletion, the operation icon 5009a can be deleted. The operation icon 5009b can also be deleted through a similar operation.

(Example of Deletion of Element Icon)

Figure 22:
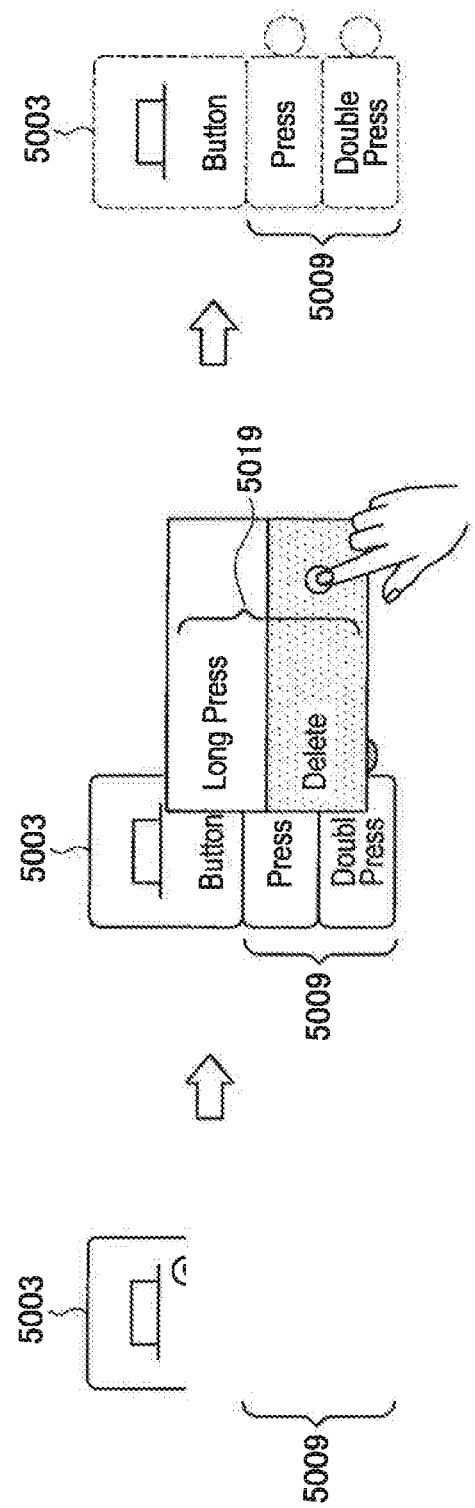
FIG. 22 is a diagram for describing deletion of an element icon in the first embodiment of the present disclosure.

FIG. 22 is a diagram for describing deletion of an element icon in the first embodiment of the present disclosure. Referring to FIG. 22, the element icon 5003 and the operation icons 5009a and 5009b associated with the element icon 5003 are displayed through the operation illustrated in, for example, FIG. 19B. If the element icon 5003 is selected in this state, an operation list 5019 is displayed. In the illustrated example, the operation list 5019 includes an option for deletion in addition to an operation "Long Press" that has not yet been displayed as an operation icon 5009. Here, if a user selects deletion, the element icon 5003 can be deleted. When the element icon 5003 is deleted, the operation icons 5009a and 5009b are deleted accordingly.

Note that the operation list 5019 displayed in the example illustrated in FIG. 22 is an example different from the operation list 5007 described with reference to FIGS. 19A and 19B described above. That is, while all of the operations of the elements indicated as the element icon 5003 are displayed on the operation list 5007, only operations that are not displayed as the operation icons 5009 are displayed on the operation list 5019. In addition, while the option for deletion is not displayed on the operation list 5007, the option for deletion is displayed on the operation list 5019. When the operation list 5007 is displayed, for example, an option for deletion of the element icon 5003 can be presented by executing another operation, for example, long-pressing the element icon 5003 or pressing it twice.

(Example of Display of Property of Operation)

Figure 23:
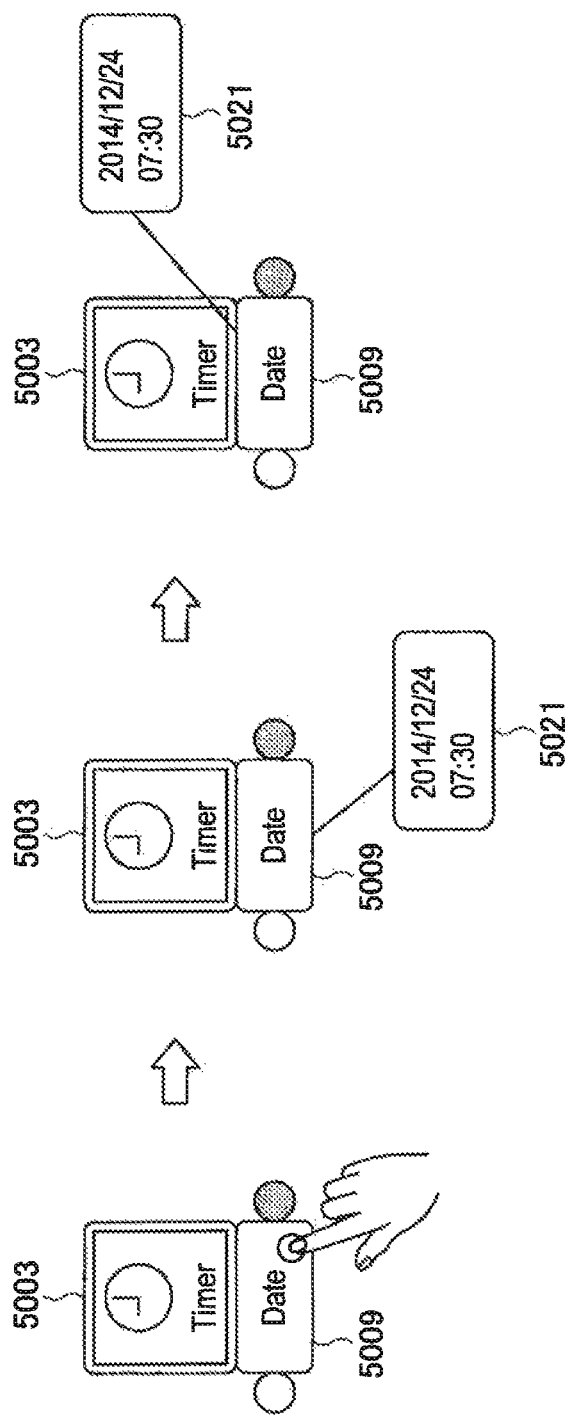
FIG. 23 is a diagram for describing display of a property of an operation in the first embodiment of the present disclosure.

FIG. 23 is a diagram for describing display of a property of an operation in the first embodiment of the present disclosure. Referring to FIG. 23, an element icon 5003 and an operation icon 5009 are displayed. In the example of FIG. 23, the element icon 5003 indicates a software element of a timer. The operation icon 5009 indicates "Date," that is, a function of causing the timer to operate at a predetermined time on a predetermined date.

Here, when a user selects the operation icon 5009, an operation property 5021 is displayed. In the illustrated example, the operation property 5021 indicates a date and time of operation of the timer. The operation property 5021 may be displayed only while, for example, a user sets selection of the operation icon 5009 to be continued, or may be continuously displayed even after the user cancels the selection of the operation icon 5009. When the operation property 5021 is continuously displayed, the user may change a display position of the operation property 5021 through dragging, for example, as illustrated.

(Example of Branch—Part 1)

Figure 24:
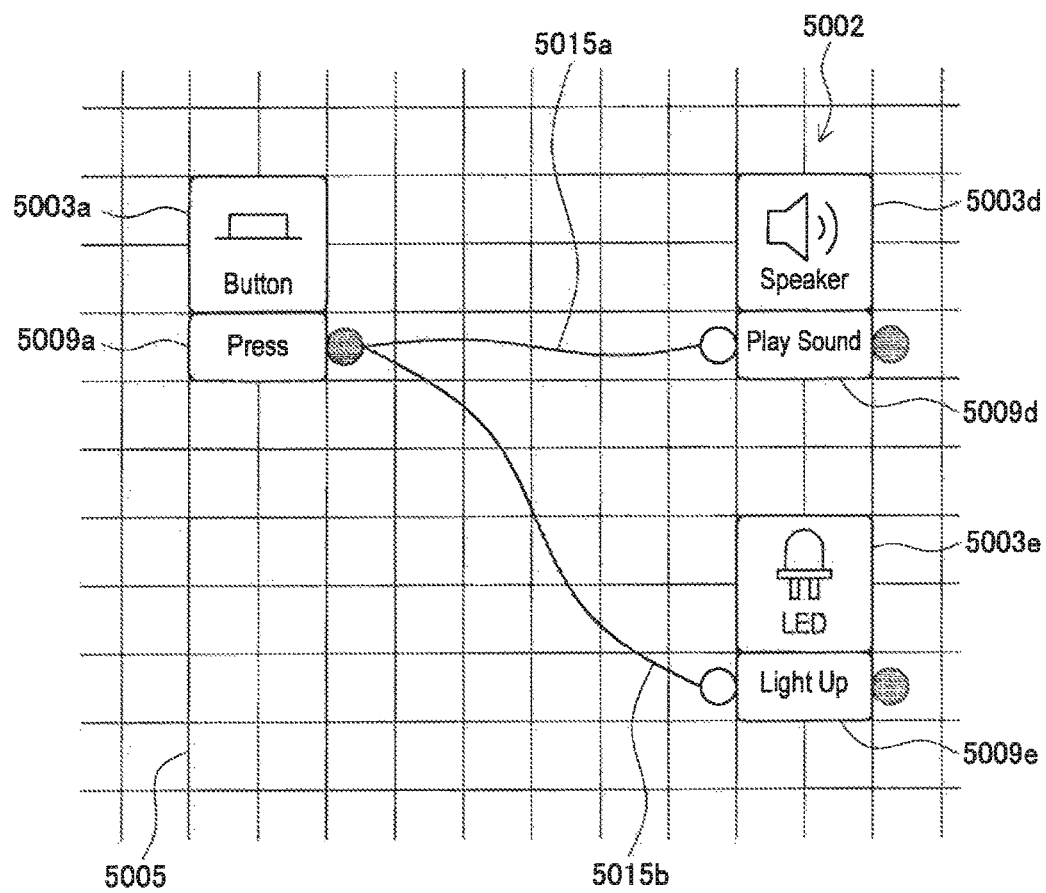
FIG. 24 is a diagram illustrating a first example of branching formed by icons and links in the first embodiment of the present disclosure.

FIG. 24 is a diagram illustrating a first example of branches formed by icons and links in the first embodiment of the present disclosure. In the example illustrated in FIG. 24, the element icon 5003a indicating the button 100d, an element icon 5003d indicating the speaker 100e, and an element icon 5003e indicating the LED lamp 100f are disposed in the field 5002. In addition, the operation icon 5009a indicating "Press" in association with the element icon 5003a, an operation icon 5009d indicating "Play Sound" in association with the element icon 5003d, and an operation icon 5009e indicating "Light Up" in association with the element icon 5003e are displayed. Furthermore, a link 5015a connects the operation icon 5009a and the operation icon 5009d, and another link 5015b connects the operation icon 5009a and the operation icon 5009e.

In the illustrated example, a spatial sequence of the icons (including the element icons 5003 and the operation icons 5009) that are disposed in the field 5002 formed by the links 5015 includes branches from a first icon (the element icon 5003a and the operation icon 5009a) to each of a plurality of second icons (the element icon 5003d and the operation icon 5009d, and the element icon 5003e and the operation icon 5009e). In addition, in the illustrated example, the branches from the first icon and the second icons are formed by the links 5015a and 5015b connecting the single operation icon (the operation icon 5009a) included in the first icon and the operation icons included in the second icons (the operation icons 5009d and 5009e).

This spatial sequence indicates a temporal sequence in which, when an operation indicated by the first icon occurs, operations indicated by each of the second icons accordingly occur in synchronization with the aforementioned operation. In the present embodiment, an operation indicated by a single operation icon can be set as a trigger for operations indicated by a plurality of other operation icons as described above. Conversely, operations indicated by a plurality of operation icons can be set as a trigger (an AND condition/an OR condition) for an operation indicated by a single operation icon.

More specifically, in the illustrated example, the links 5015a and 5015b express linked operations in which the speaker 100e (the element icon 5003d) reproduces a sound (the operation icon 5009d) and the LED lamp 100f (the element icon 5003e) lights up (the operation icon 5009e) with the fact that the button 100d (the element icon 5003a) has been pressed (an operation icon 5009a) as a trigger. Here, the operation of the speaker 100e reproducing a sound and the operation of the LED lamp 100f lighting up occur synchronously.

Note that synchronization mentioned in the present specification does not have to mean exact matching of times at which operations are performed. For example, when the button 100d is detected to have been pressed, the manager 200 transmits a control signal to the speaker 100e and the LED lamp 100f substantially at the same time, however, times at which operations occur may not necessarily exactly match due to a delay occurring on a communication path or inside the speaker 100e and the LED lamp 100f.

(Example of Branch—Part 2)

Figure 25:
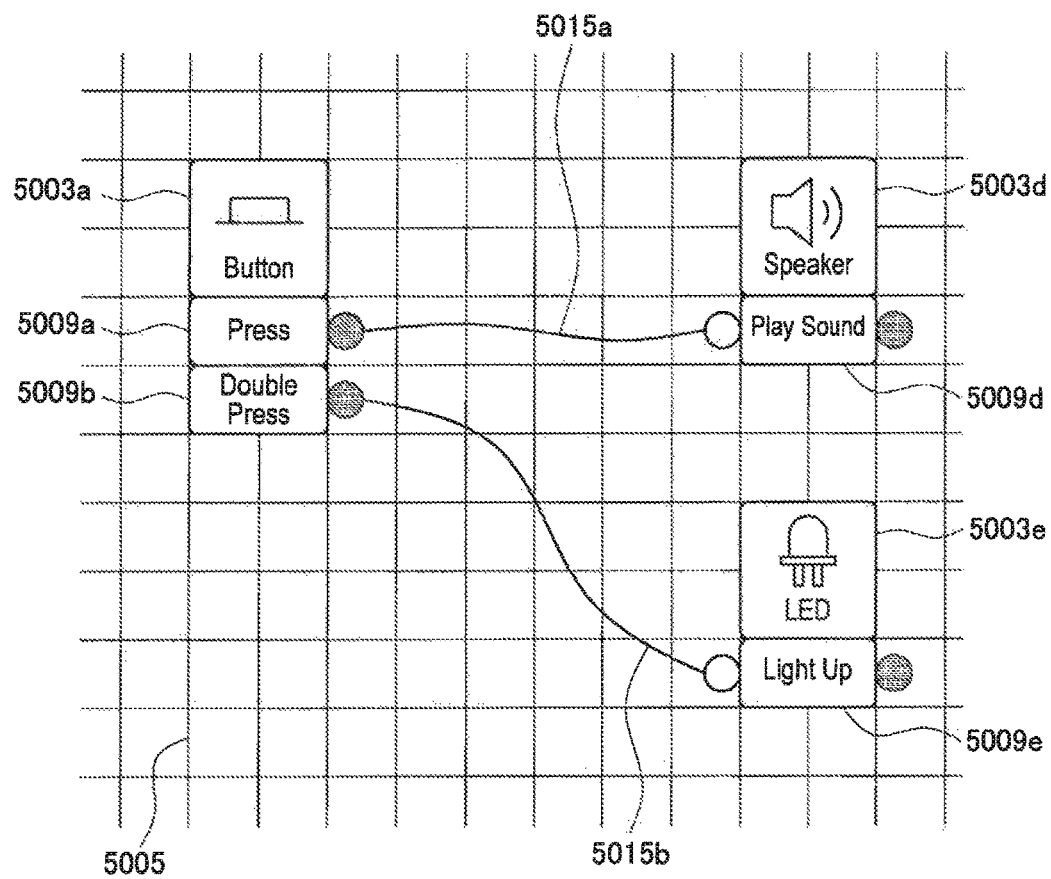
FIG. 25 is a diagram illustrating a second example of branching formed by icons and links in the first embodiment of the present disclosure.

FIG. 25 is a diagram illustrating a second example of branches formed by the icons and links in the first embodiment of the present disclosure. In the example illustrated in FIG. 25, the element icons 5003a, 5003d, and 5003e are disposed in the field 5002 as in the example of FIG. 24 described above. In addition, the element icons 5003a, 5003d, and 5003e are displayed in association with the operation icons 5009a, 5009d, and 5009e, respectively. Furthermore, as a difference from the example of FIG. 24, the element icon 5003a is also displayed in association with the operation icon 5009d indicating "Double Press." The link 5015a connects the operation icon 5009a and the operation icon 5009d, and the link 5015b connects the operation icon 5009b and the operation icon 5009e.

Also in the illustrated example, a spatial sequence of the icons (including the element icons 5003 and the operation icons 5009) disposed in the field 5002 formed by the links 5015 includes branches from a first icon (the element icon 5003a and an operation icons 5009a and 5009b) to a plurality of second icons (the element icon 5003d and the operation icon 5009d, and the element icon 5003e and the operation icon 5009e), as in the example of FIG. 24 described above. On the other hand, in the illustrated example, the plurality of operation icons (the operation icons 5009a and 5009b) included in the first icon are respectively connected to the operation icons (the operation icons 5009d and 5009e) each included in the second icons by the links 5015a and 5015b, and thus the branches from the first icon to the second icons are formed.

This spatial sequence indicates a two-track temporal sequence in which, when any of a plurality of operations indicated by the first icon occurs, an operation indicated by any of the second icons occurs accordingly. In this manner, each of operations indicated by the plurality of operation icons associated with the same element icon can be set as a trigger for operations indicated by other operation icons that are different from each other in the present embodiment. Conversely, the operations indicated by the other operation icons that are different from each other may be set as triggers for each of the operations indicated by the plurality of operation icons associated with the same element icon.

More specifically, in the illustrated example, the links 5015a and 5015b express linked operations in which, while the speaker 100e (the element icon 5003d) reproduces a sound (the operation icon 5009d) with the fact that the button 100d (the element icon 5003a) has been pressed (the operation icon 5009a) as a trigger, the LED lamp 100f (the element icon 5003e) lights up (the operation icon 5009e) with the fact that the button 100d (the element icon 5003a) has been pressed twice (the operation icon 5009b) as a trigger.

(Example of Two-Track Connection)

Figure 26:
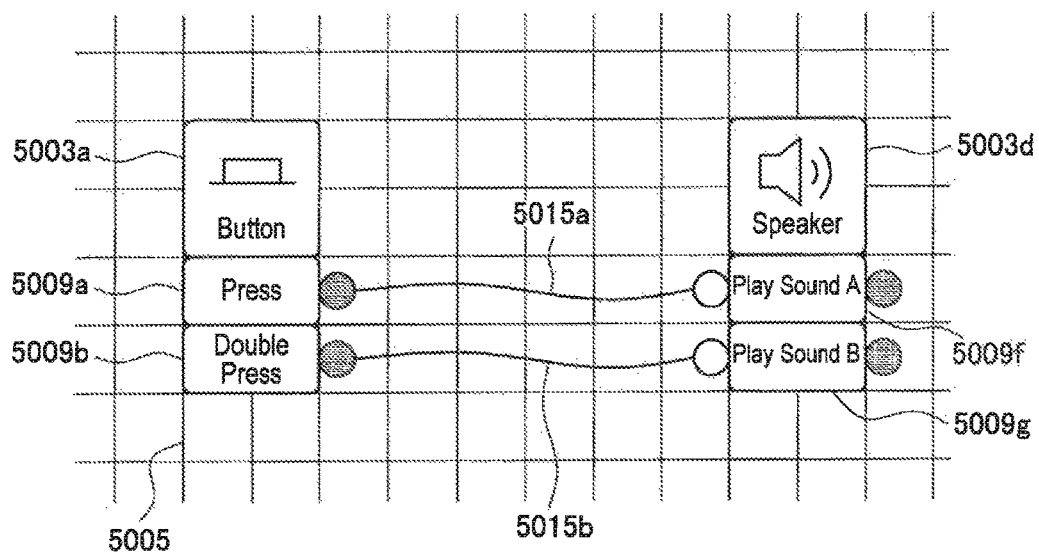
FIG. 26 is a diagram illustrating a two-track connection formed by the icons and the links in the first embodiment of the present disclosure.

FIG. 26 is a diagram illustrating an example of a two-track connection formed by the icons and links in the first embodiment of the present disclosure. In the example illustrated in FIG. 26, the element icon 5003a indicating the button 100d, and the element icon 5003d indicating the speaker 100e are disposed in the field 5002. In addition, the element icon 5003a is displayed in association with the operation icon 5009a indicating "Press" and the operation icon 5009b indicating "Double Press," and the element icon 5003d is displayed in association with an operation icon 5009f indicating "Play Sound A" and an operation icon 5009g indicating "Play Sound B." Furthermore, the link 5015a connects the operation icon 5009a and the operation icon 5009f, and the link 5015b connects the operation icon 5009b and the operation icon 5009g.

In the illustrated example, spatial sequences of the icons (including the element icons 5003 and the operation icons 5009) disposed in the field 5002 formed by the links 5015 include a two-track connection between the plurality of respective operation icons (the operation icons 5009a and 5009b) included in a first icon and the respective operation icons (the operation icons 5009f and 5009g) included in a second icon.

This spatial sequence indicates a two-track temporal sequence in which, when any of the plurality of operations of the element indicated by the first icon occurs, any of the plurality of operations of the element indicated by the second icon occurs accordingly. In this manner, each of operations indicated by a plurality of operation icons associated with the same element icon can be set as a trigger for operations indicated by other operation icons that are different from each other in the present embodiment Conversely, the operations indicated by the other operation icons that are different from each other may be set as triggers for each of the operations indicated by the plurality of operation icons associated with the same element icon.

More specifically, in the illustrated example, the links 5015a and 5015b express linked operations in which, while the speaker 100e reproduces a sound A (the operation icon 5009f) with the fact that the button 100d (the element icon 5003a) has been pressed (the operation icon 5009a) as a trigger, the speaker 100e reproduces a sound B (the operation icon 5009g) with the fact that the button 100d (the element icon 5003a) has been pressed twice (the operation icon 5009b) as a trigger.

(Example of Series Linkage)

Figure 27:
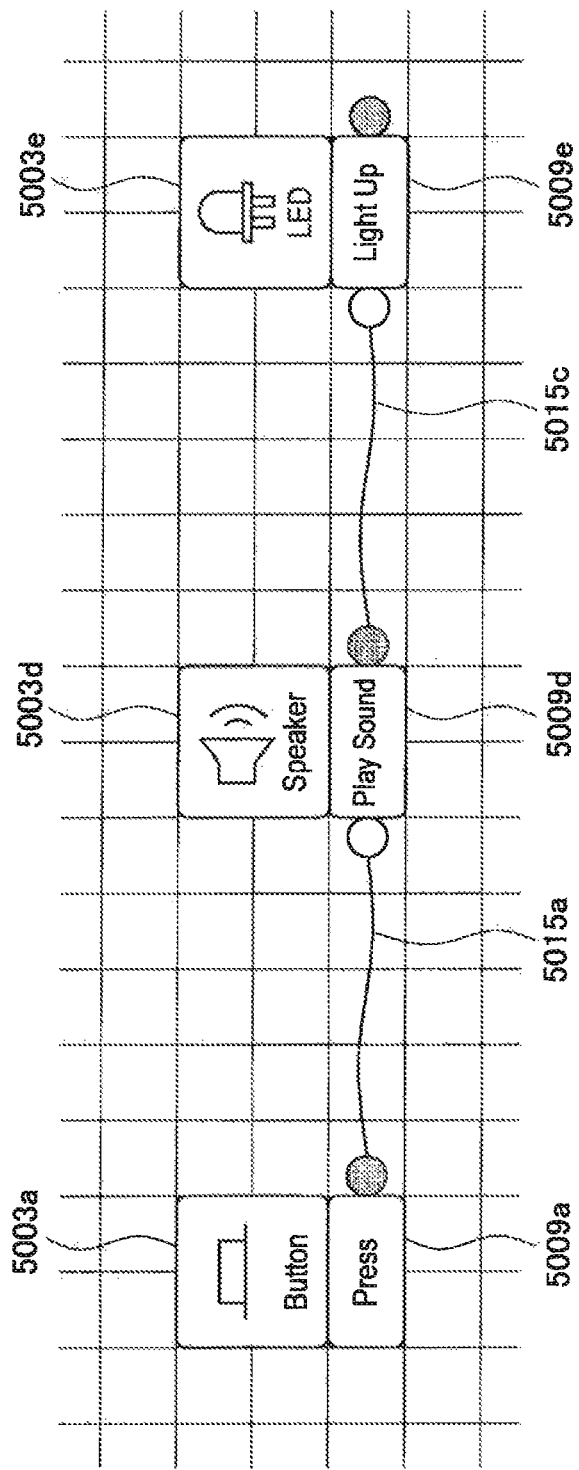
FIG. 27 is a diagram illustrating an example of series linkage formed by the icons and links in the first embodiment of the present disclosure.

FIG. 27 is a diagram illustrating an example of series linkage formed by the icons and links in the first embodiment of the present disclosure. In the example illustrated in FIG. 27, the element icon 5003a indicating the button 100d, the element icon 5003d indicating the speaker 100e, and the element icon 5003e indicating the LED lamp 100f are disposed in the field 5002. In addition, the element icon 5003a is displayed in association with the operation icon 5009a indicating "Press," the element icon 5003d is displayed in association with the operation icon 5009d indicating "Play Sound," and the element icon 5003e is displayed in association with the operation icon 5009e indicating "Light Up." Furthermore, the link 5015a connects the operation icon 5009a and the operation icon 5009d, and the link 5015b connects the operation icon 5009d and the operation icon 5009e.

In the illustrated example, a spatial sequence of the icons (including the element icons 5003 and the operation icons 5009) disposed in the field 5002 formed by the links 5015 includes series linkage of the plurality of icons. This spatial sequence indicates a temporal sequence in which the operations indicated by each of the plurality of icons occur in the order of the linkage. In this manner, an operation indicated by a first operation icon can be set as a trigger for an operation indicated by a second icon, and the operation indicated by the second icon can be set as a trigger for an operation indicated by a third icon in the present embodiment.

More specifically, in the illustrated example, the links 5015a and 5015b express a linked operation in which the speaker 100e (the element icon 5003d) reproduces a sound (the operation icon 5009d) with the fact that the button 100a has been pressed (the operation icon 5009a) as a trigger, and further the LED lamp 100f (the element icon 5003e) lights up (the operation icon 5009e) with the fact that the speaker 100e reproduces the sound as a trigger. Here, lighting up of the LED lamp 100f may start immediately after the speaker 100e starts reproduction of the sound, after reproduction of the sound is finished, or after a delay of a predetermined period of time from reproduction of the sound.

Note that the linked operation expressed by the series linkage described above does not necessarily mean that control signals for each of the elements are transmitted in series. For example, when the button 100d is detected to have been pressed, the manager 200 transmits control signals to each of the speaker 100e and the LED lamp 100f, however, paths on which the control signals are transmitted to the elements may be independent from each other. In that case, the manager 200 adjusts transmission timings of the control signals, a time delayed before a start of an operation, and the like so that the speaker 100e starts reproduction of a sound first and then the LED lamp 100f lights up.

(Example of Adjustment of Grid—Part 1)

Figure 28:
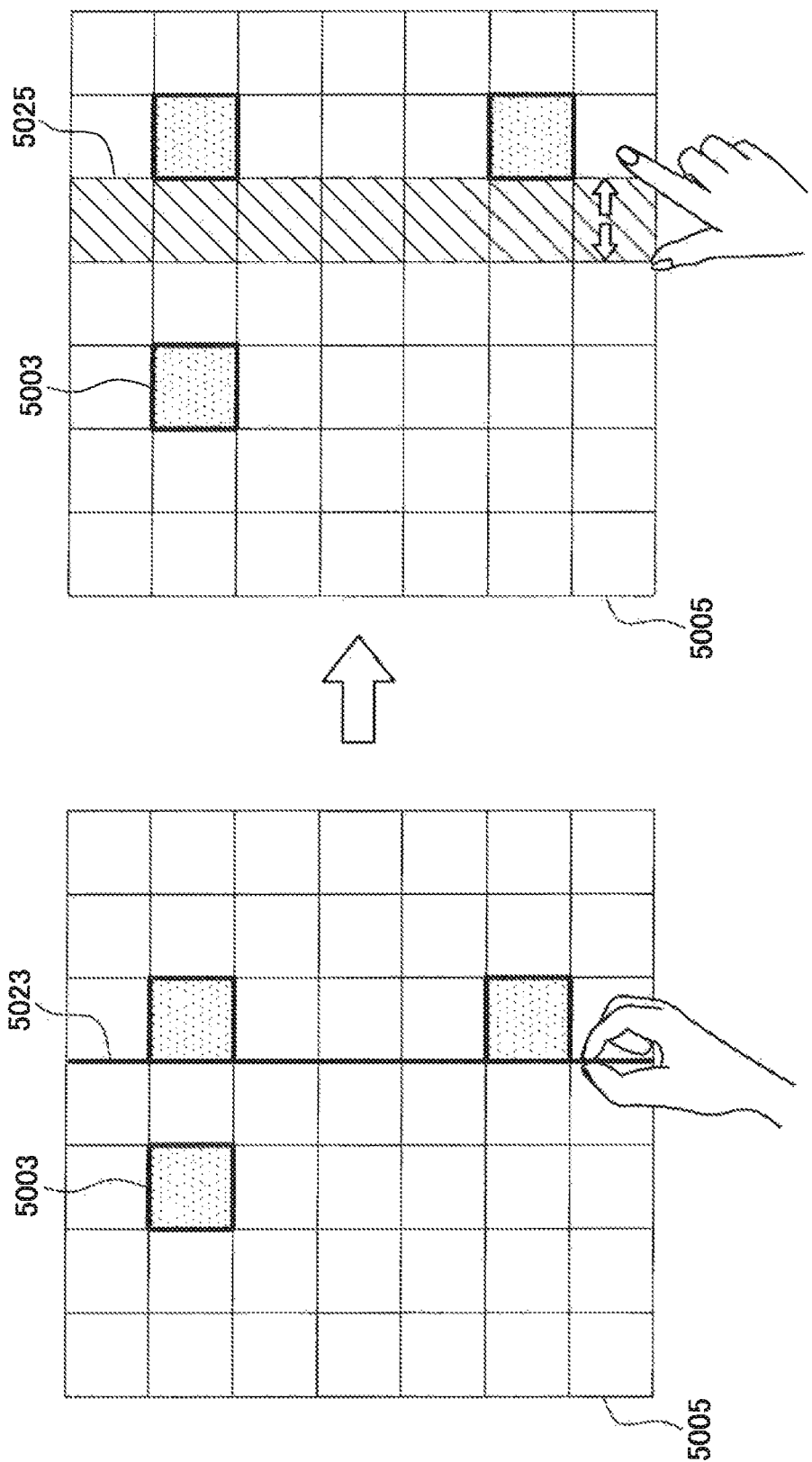
FIG. 28 is a diagram illustrating a first example of adjustment of a grid according to the first embodiment of the present disclosure.

FIG. 28 is a diagram illustrating a first example of adjustment of a grid in the first embodiment of the present disclosure. In the example illustrated in FIG. 28, a plurality of element icons 5003 are disposed in the field 5002. In addition, the grid lines 5005 are displayed in the field 5002. In the illustrated example, each of the element icons 5003 is automatically aligned with the grid lines 5005. Note that, although no operation icons 5009 are illustrated, the icons may be displayed in association with the element icons 5003.

Here, in the illustrated example, the input/output unit 430 of the UI device 400 includes a touch panel, and a user executes a pinch-out operation at a position crossing a certain grid line 5023. When an operation acquisition unit realized by the control unit 420 of the UI device 400 (or the control unit 220 of the manager 200, or the control unit 320 of the server 300; the same applies in the following description) acquires this operation, a display control unit likewise realized by the control unit 420 divides the grid line 5023 designated through the pinch-out operation, and inserts a new column 5025 between corresponding divided grid lines.

Note that, although the grid line 5023 is set to be divided in the above description, it is set in consideration of a visual aspect, and it is not necessary to divide the grid line 5023 if internal processes are considered. For example, when the above-described pinch-out operation is executed, a new grid line may be generated close to the grid line 5023, and a new column 5025 may be inserted between the new grid line and the grid line 5023. Although the new column 5025 is inserted because the vertical grid line 5023 is selected in the above example, a new row can be inserted when a horizontal grid line is selected through a similar operation.

In addition, an operation for dividing the grid line 5023 and inserting the new column 5025 is not limited to the pinch-out operation described above. For example, the grid line 5023 may be designated through a tapping operation using a touch panel or an operation using a mouse. In this case, in order to specify that an operation of designating the grid line 5023 means insertion of the column 5025, an operation mode that is different from a normal one, for example, a position adjustment mode, may be set. In this manner, a first user operation of designating a grid line in the present embodiment can include any of various operations, for 26 example, an operation of selecting a grid line, a pinch-out operation at a position crossing a grid line, or the like.

(Example of Adjustment of Grid—Part 2)

Figure 29:
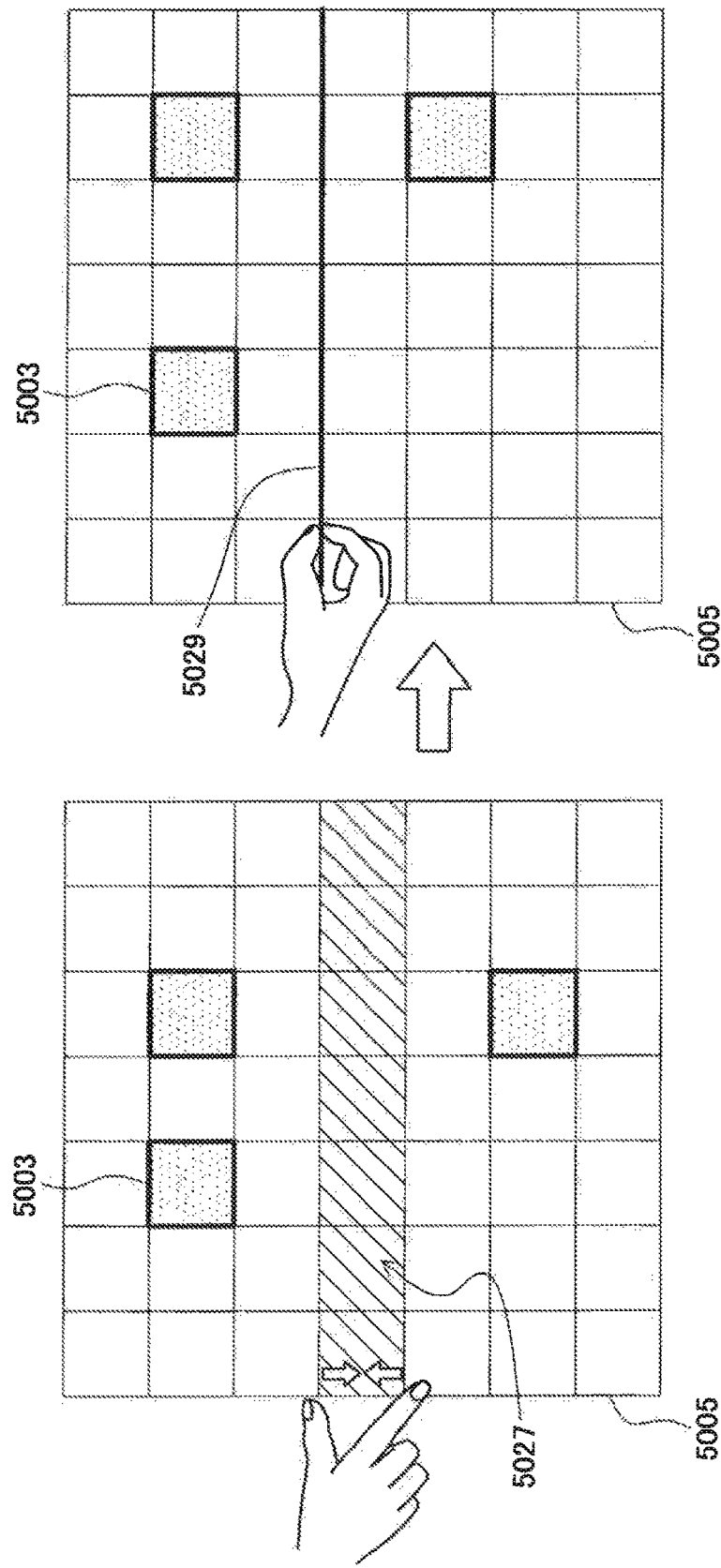
FIG. 29 is a diagram illustrating a second example of adjustment of a grid according to the first embodiment of the present disclosure.

FIG. 29 is a diagram illustrating a second example of adjustment of a grid in the first embodiment of the present disclosure. Also in the example illustrated in FIG. 29, the plurality of element icons 5003 are displayed in the field 5002. In addition, the grid lines 5005 are displayed in the field 5002. Also in the illustrated example, each of the element icons 5003 is automatically aligned with the grid lines 5005. Note that, although no operation icons 5009 are illustrated, the icons may be displayed in association with the element icons 5003.

Here, in the illustrated example, the input/output unit 430 of the UI device 400 includes a touch panel, and a user executes a pinch-in operation at a position crossing a row 5027 defined by grid lines 5005. When the operation acquisition unit realized by the control unit 420 of the UI device 400 acquires this operation, the display control unit likewise realized by the control unit 420 deletes the row 5027 designated through the pinch-in operation, and thereby the grid lines at both sides of the deleted row are integrated to form a single grid line 5029.

Note that the grid lines at both sides of the row 5027 are set to be integrated in the above description; however, this is in consideration of a visual aspect, and it is not necessary to integrate the grid lines to create the grid line 5029 if internal processes are considered. For example, when the above-described pinch-in operation is executed, the grid lines at both sides of the row 5027 get close to each other, and one of the grid lines may be deleted in the state in which the lines are adjacent to each other to leave the grid line 5029. Although the horizontal row 5027 is deleted in the above example, a vertical column can be deleted through a similar operation.

In addition, an operation for deleting the row 5027 is not limited to the pinch-in operation described above. The row 5027 may be designated through an operation such as a tapping operation using a touch panel or an operation using a mouse. In this case, in order to specify that an operation of designating the row 5027 means deletion of the row 5027, an operation mode that is different from a normal mode, for example, a position adjustment mode, may be set. When the row 5027 is deleted according to a pinch-in operation, the pinch-in operation may not necessarily be executed at a position crossing the entire row 5027, and the pinch-in operation may be executed crossing at least a part of the row 5027. As described above, a second user operation for designating a row or a column in the present embodiment can include any of various operations, for example, an operation of selecting a row or a column, a pinch-in operation at a position crossing at least a part of a row or a column, or the like.

According to the first and second examples of adjustment of a grid described above, disposition of the element icons 5003 or the operation icons 5009 displayed in the field 5002 can be adjusted through an intuitive operation on the screen 5000 provided as a user interface. In the examples described above, a linked operation between elements is expressed by, for example, the links 5015 connecting the operation icons 5009 in the present embodiment. Thus, inserting a gap in which the links 5015 are disposed between the icons through, for example, the operation as in the first example described above can be useful. When, for example, user operations are received mainly via the touch panel included in the input/output unit 430 of the UI device 400, an operation of designating a region which includes the plurality of icons 5003 on the screen 5000 is not easy at all times, unlike an operation using a mouse. Since a region which includes the plurality of icons 5003 may not necessarily be designated if the plurality of icons 5003 are moved along with the field 5002 through the operation as in the above-described example, operability of a touch panel can be improved.

2-2. Second Embodiment

Next, a second embodiment of the present disclosure will be described. A user interface and user operations provided in the present embodiment are similar to those in the first embodiment described above, but are partially different. The differences will be mainly described below, and overlapping description of configurations similar to those of the first embodiment will be omitted.

(First Display Example)

Figure 30:
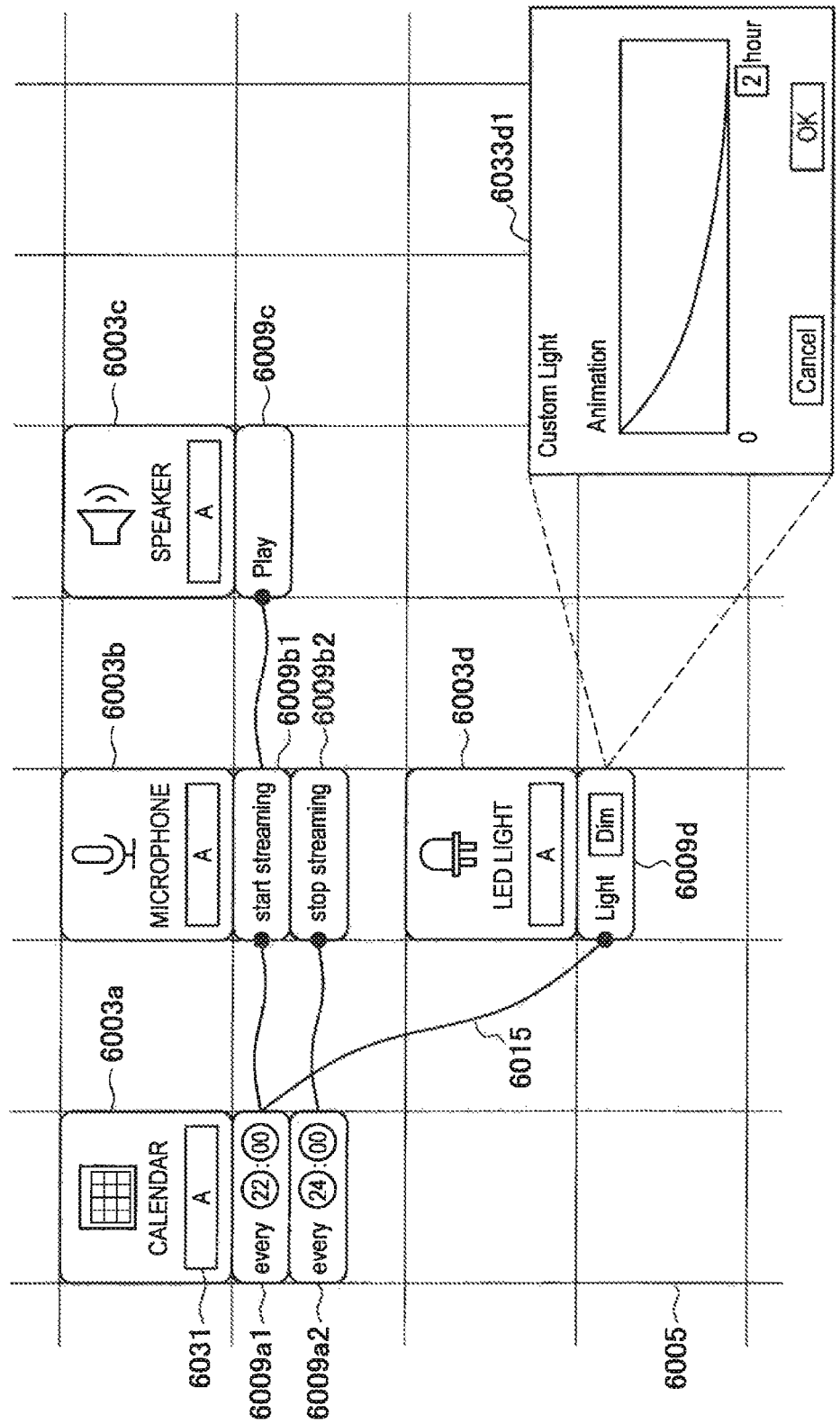
FIG. 30 is a diagram illustrating a first display example according to a second embodiment of the present disclosure.

FIG. 30 is a diagram illustrating a first display example according to the second embodiment of the present disclosure. Referring to FIG. 30, element icons 6003, grid lines 6005, and operation icons 6009 are included on a screen displayed on a display as a user interface of the present embodiment. These constituent elements correspond to the element icons 5003, the grid lines 5005, and the operation icons 5009 described in the first embodiment above. In the present embodiment, however, names unique to elements can be given to the element icons 6003 using name fields 6031. In addition, in the present embodiment, a time related to an operation, a name of a pattern of an operation, or the like can be set using the operation icons 6009 such as operation icons 6009a1 and 6009a2, or an operation icon 6009d in the illustrated example. The constituent elements of the user interface related to the display example will be described below in more detail.

An element icon 6003a indicating a software element "calendar" is associated with the operation icons 6009a1 and 6009a2. Although both of the operation icons 6009a1 and 6009a2 indicate an operation of an alarm function provided by the software element "calendar," set alarm times are different. The operation icon 6009a1 is connected to an operation icon 6009b1 of an element icon 6003b indicating the microphone 100g by a link 6015. The operation icon 6009b1 indicates an operation of the microphone 100g starting streaming of a sound.

Furthermore, the operation icon 6009b1 is connected to an operation icon 6009c of an element icon 6003c indicating the speaker 100e by the link 6015. The operation icon 6009c indicates an operation of the speaker 100e reproducing a predetermined sound. Due to series linkage from the operation icon 6009a1 to the operation icon 6009c via the operation icon 6009b1, an order of operations in which the microphone 100g starts streaming and the speaker 100e reproduces a sound (which can notify a user of a start of streaming) at 22:00 every day is defined.

Meanwhile, the operation icon 6009a2 is connected to an operation icon 6009b2 by the link 6015. The operation icon 6009b2 indicates an operation of the microphone 100g finishing the streaming of the sound. Due to a two-track connection from the respective operation icons 6009a1 and 6009a2 to the respective operation icons 6009b1 and 6009b2, operations occurring at different times, i.e., starting streaming at 22:00 every day and finishing streaming at 24:00 every day, can be defined.

Furthermore, the operation icon 6009a1 is also connected to the operation icon 6009d of an element icon 6003d indicating the LED lamp 100f. The operation icon 6009d indicates an operation of the LED lamp 100f lighting up (dimly). Here, an operation property 6033d1 is displayed for the operation icon 6009d. The operation property 6033d1 indicates a property of the lighting operation of the LED lamp 100f of the operation icon 6009d, more specifically, a setting of temporal changes in a light amount. With the operation property 6033d1, a user can set a time during which a light amount is attenuated as in, for example, the illustrated example.

(Second Display Example)

Figure 31:
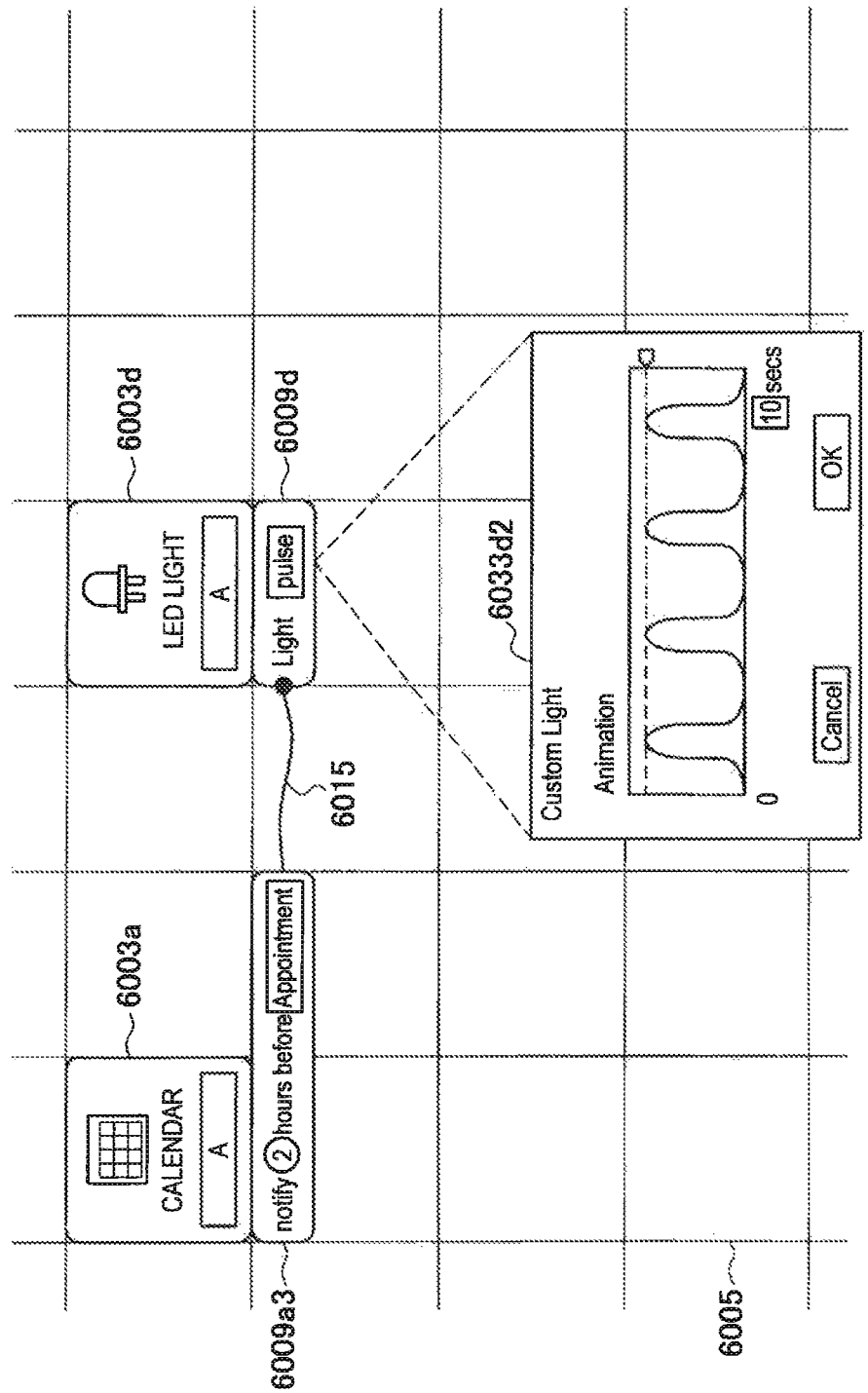
FIG. 31 is a diagram illustrating a second display example according to a second embodiment of the present disclosure.

FIG. 31 is a diagram illustrating a second display example according to the second embodiment of the present disclosure. In the example of FIG. 31, an operation icon 6009a3 of the element icon 6003a indicating the software element "calendar" is connected to the operation icon 6009d of the element icon indicating the LED lamp 100f by the link 6015. The operation icon 6009a3 indicates an operation of "giving a notification two hours before an appointment." In the illustrated example, the portion "appointment" and the portion "two hours before" can be set using the operation icon 6009a3. The operation icon 6009d indicates an operation of the LED lamp 100f lighting up (in a pulsating manner). Here, an operation property 6033d2 is displayed for the operation icon 6009d. The operation property 6033d2 indicates a property of a lighting operation of the LED lamp 100f indicated by the operation icon 6009d, more specifically, a setting of temporal changes in a light amount, similar to the operation property 6033d1 in the first example described above. With the operation property 6033d2, a user can set a time in which a pulsating change in the light amount is repeated as in, for example, the illustrated example.

(Third Display Example)

Figure 32:
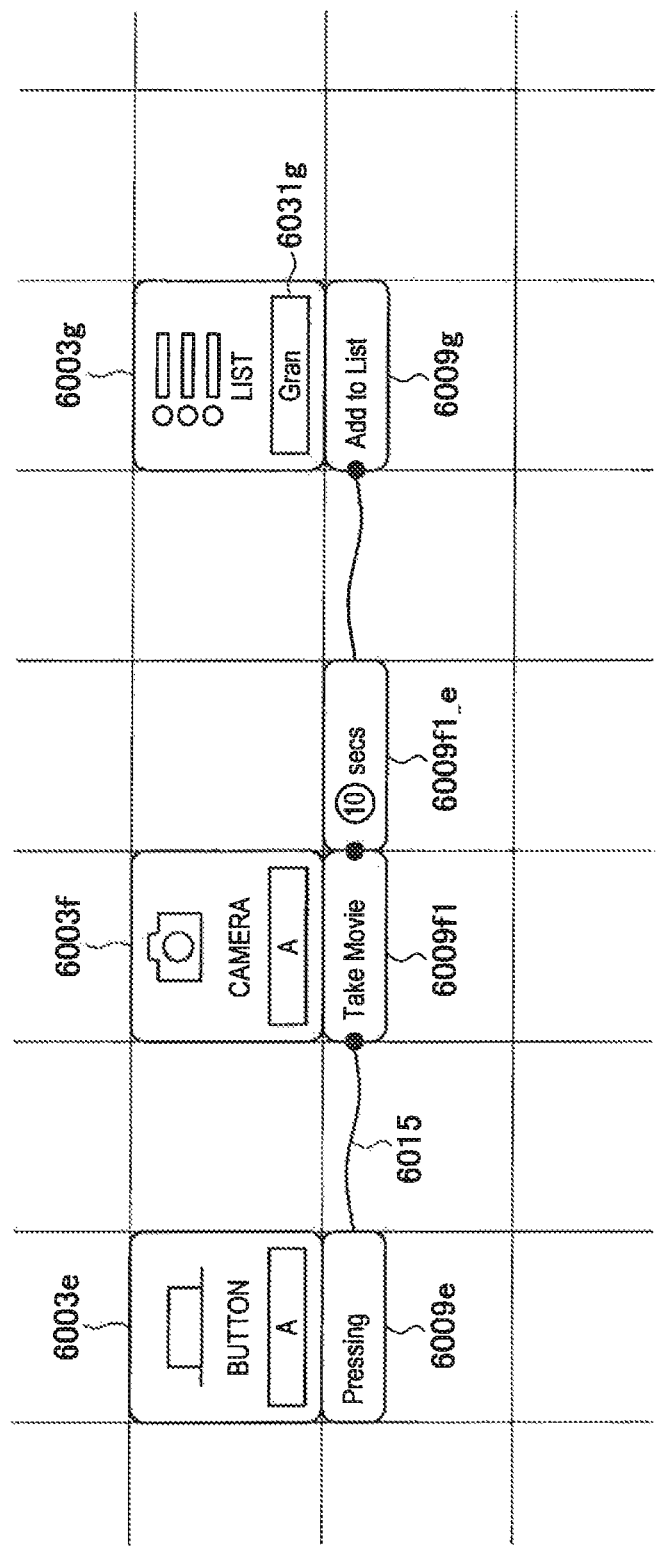
FIG. 32 is a diagram illustrating a third display example according to a second embodiment of the present disclosure.

FIG. 32 is a diagram illustrating a third display example according to the second embodiment of the present disclosure. In the example of FIG. 32, an operation icon 6009*e* of an element icon 6003*e* indicating the button 100*d* is connected to an operation icon 6009*f*1 of an element icon 6003*f* indicating the camera 100*b* by the link 6015. The operation icon 6009*e* indicates an operation of "pressing the button 100*d*." Meanwhile, the operation icon 6009*f*1 indicates an operation of "starting photographing of a dynamic image with the camera 100*b*." An extension 6009*f*1-*e* indicating a duration of photographing is associated with the operation icon 6009*f*1. With the extension 6009*f*1-*e*, a user can set a duration of photographing.

Furthermore, the operation icon 6009*f*1 is connected to an operation icon 6009*g* of an element icon 6003*g* indicating a software element "list" by the link 6015. The operation icon 6009*g* indicates an operation of adding data such as a provided dynamic image to the list. Note that, in the present embodiment, a list storing an arbitrary data object in a storage realized by a server on a network, for example, can be provided. By adding data to this list, a user can share data with other users. As an example of a specific use method in the illustrated example, the software element "list" indicated by the element icon 6003*g* is prepared for sharing dynamic image data with grandparents. Thus, a name field 6031*g* is set with a name "Gran."

(Fourth Display Example)

Figure 33:
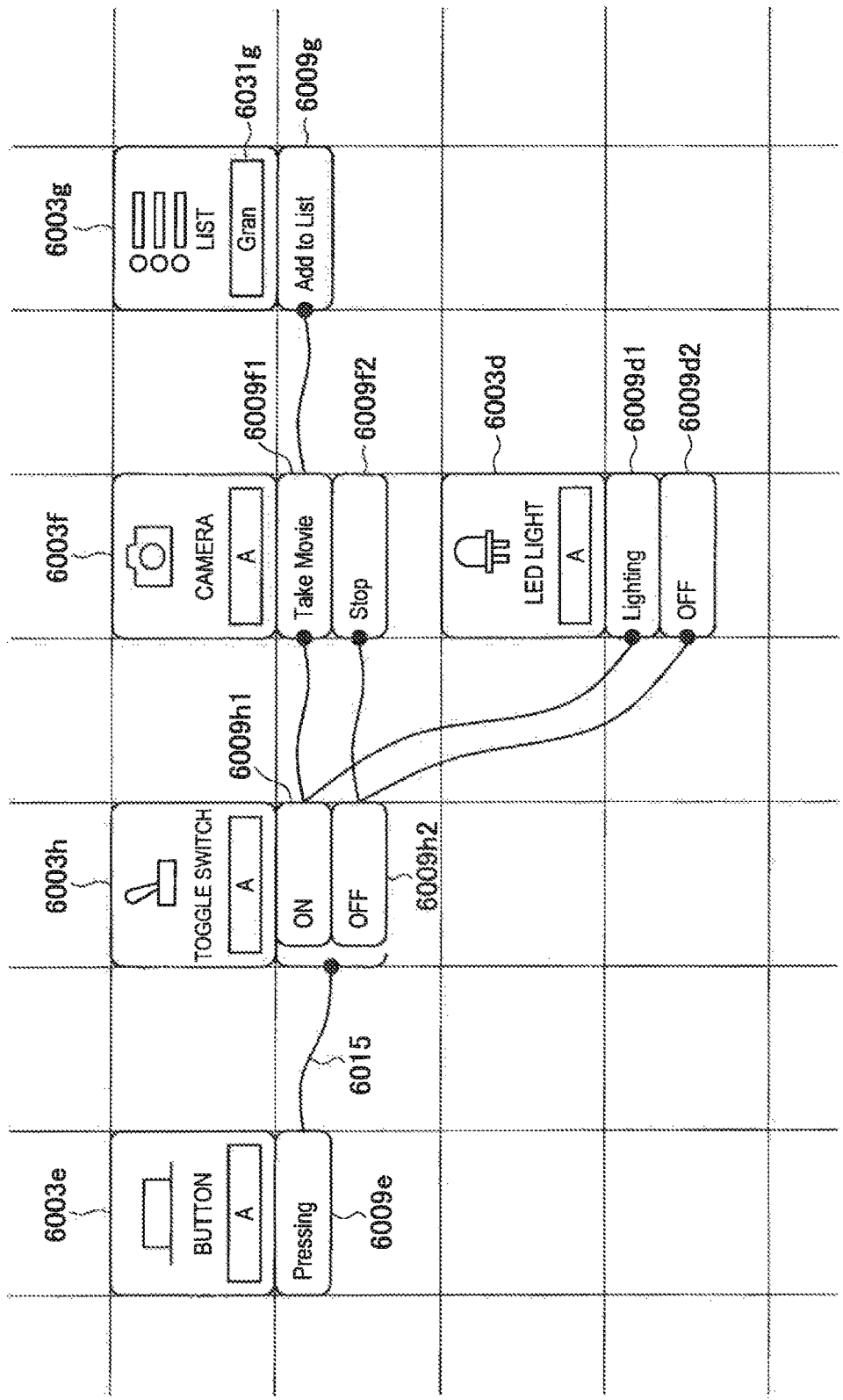
FIG. 33 is a diagram illustrating a fourth display example according to a second embodiment of the present disclosure.

FIG. 33 is a diagram illustrating a fourth display example according to the second embodiment of the present disclosure. In FIG. 33, an example of another setting for a linked operation of elements to realize a function similar to the third example described above is illustrated. In the example of FIG. 33, the operation icon 6009*e* of the element icon 6003*e* indicating the button 100*d* is connected to an operation icon of an element icon 6003*h* indicating a software element "toggle switch" by the link 6015. The software element "toggle switch," as a special function, alternately switches operations to be executed when a triggering operation occurs in another element.

In the illustrated example, when an operation of pressing the button 100*d* indicated by the operation icon 6009*e* occurs, the switch is ON (or OFF) as indicated by an operation icon 6009*h*1 the first time, the switch is OFF (or ON) as indicated by an operation icon 6009*h*2 the second time, and the switch is ON (or OFF) again as indicated by an operation icon 6009*h*1 the third time. Note that ON and OFF of the switch are levels set for the sake of convenience. The software element "toggle switch" can switch not only operations corresponding to ON and OFF but also various types of operations. In addition, the number of operations to be switched is not limited to two, and three or more operations may be switched to be executed in order.

Among the operation icons of the element icon 6003*h* indicating the software element "toggle switch," the operation icon 6009*h*1 indicating the operation of switching to ON is connected to an operation icon 6009*f*1 of an element icon 6003*f* indicating the camera 100*b* by the link 6015. The operation icon 6009*f*1 indicates an operation of "starting photographing of a dynamic image with the camera 100*b*." Furthermore, the operation icon 6009*f*1 is connected to an operation icon 6009*g* of an element icon 6003*g* indicating the software element "list" by the link 6015. The operation icon 6009*g* indicates an operation of adding data such as a provided dynamic image or the like to the list. In addition, the operation icon 6009*h*1 is also connected to an operation icon 6009*d*1 indicating lighting of the LED lamp 100*f* (the element icon 6003*d*).

Meanwhile, the operation icon 6009*h*2 indicating the operation of switching to OFF among the operation icons of the element icon 6003*h* is connected to an operation icon 6009*f*2 of the element icon 6003*f* indicating the camera 100*b* by the link 6015. The operation icon 6009*f*2 indicates an operation of "finishing photographing with the camera 100*b*." In addition, the operation icon 6009*h*2 is also connected to an operation icon 6009*d*2 indicating extinguishment of the LED lamp 100*f* (the element icon 6003*d*).

In the example illustrated in FIG. 33 described above, as the software element "toggle switch" (the element icon 6003*h*) is introduced, starting and finishing of photographing of a dynamic image with the camera 100*b* can be arbitrarily controlled through user operations via the button 100*d*. Furthermore, in the above-described example, branches from the operation icon 6009*h*1 to the operation icon 6009*f*1 and the operation icon 6009*d*1 are formed and branches from the operation icon 6009*h*2 to the operation icon 6009*f*3 and the operation icon 6009*d*2 are formed by the link 6015. By forming these two-track branches, starting and finishing of photographing of a dynamic image with the camera 100*b* based on pressing of the button 100*d* can be synchronized with lighting up and extinguishment of the LED lamp 100*f*. Thus, the user can easily recognize whether photographing has been started or finished by pressing the button 100*d* according to lighting states of the LED lamp 100*f*.

(Fifth Display Example)

Figure 34:
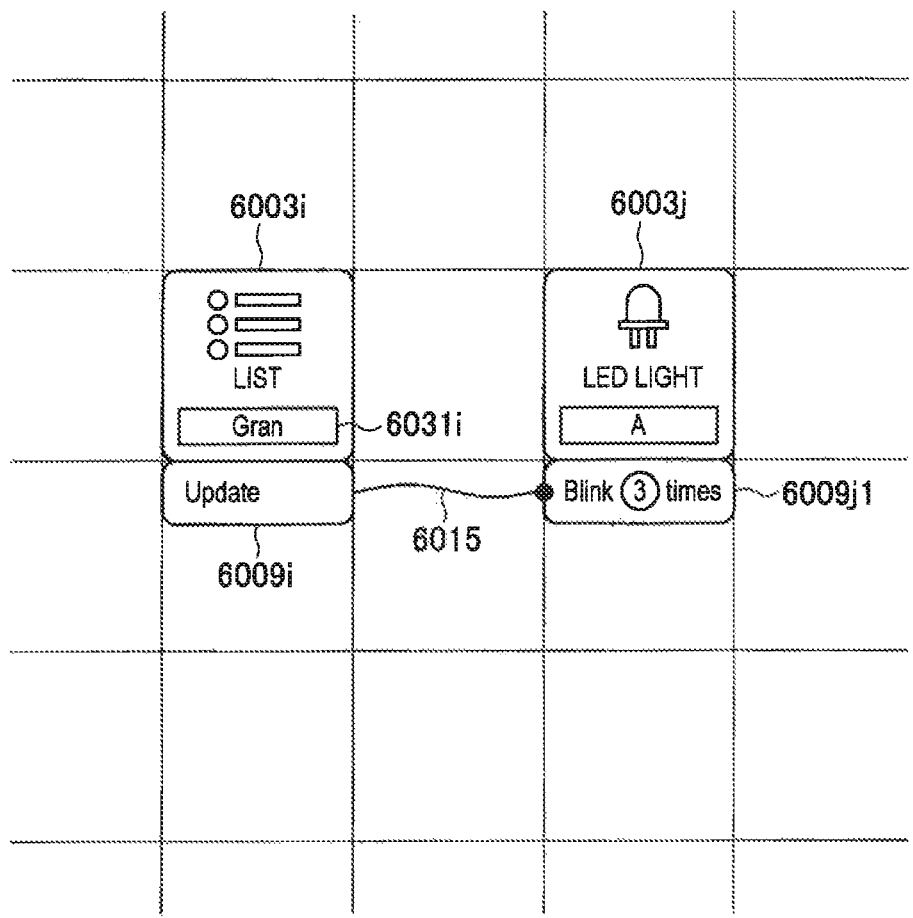
FIG. 34 is a diagram illustrating a fifth display example according to a second embodiment of the present disclosure.

FIG. 34 is a diagram illustrating a fifth display example according to the second embodiment of the present disclosure. In the example of FIG. 34, an operation icon 6009*i* of an element icon 6003*i* indicating the software element "list" is connected to an operation icon 6009*j*1 of an element icon 6003*j* indicating the LED lamp 100*f* by the link 6015. The operation icon 6009*i* indicates an operation of detecting an update of the list. Meanwhile, the operation icon 6009*j*1 indicates an operation of causing the LED lamp 100*f* to blink three times. With the operation icon 6009*j*1, a user can set the number of times of blinking as in, for example, the illustrated example.

The illustrated example can be a program of the mechanism on the reference side for sharing the dynamic image data described with reference to FIG. 32 or 33 above. In the element icon 6003*i* indicating the software element "list," a name field 6031*i* is set to have the name "Gran." That is, the software element "list" indicated by the element icon 6003*i* can refer to the same software element "list" as indicated by the element icon 6003*g* in the above-described example. For example, when an operation of adding operation data to the list is executed as indicated by the operation icon 6009*g*, updating of the list as indicated by the operation icon 6009*i* is detected, and a linked operation of the software element "list" and the LED lamp 100*f* causes the LED lamp 100*f* to blink three times to give a notification of the updating of the list (the addition of the dynamic image data).

(Sixth Display Example)

Figure 35:
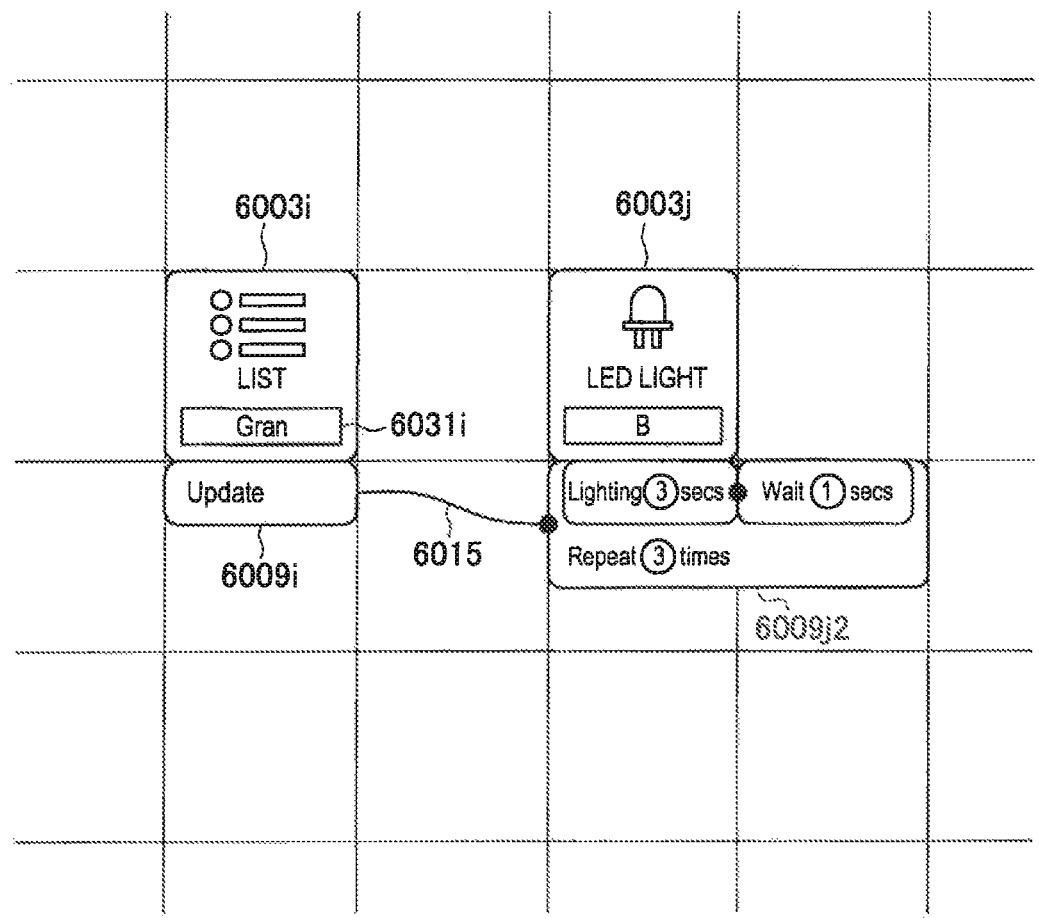
FIG. 35 is a diagram illustrating a sixth display example according to a second embodiment of the present disclosure.

FIG. 35 is a diagram illustrating a sixth display example according to the second embodiment of the present disclosure. In the example of FIG. 35, icons similar to those of the example described with reference to FIG. 34 above are disposed, and similar functions are realized, however, an operation icon 6009*j*2 associated with an element icon 6003*j* is different from the operation icon 6009*j*1 of the above-described example. With the operation icon 6009*j*2, more detailed blinking patterns of the LED lamp 100*f* including a lighting-up time, a standby (extinguishment) time, and the number of repetitions can be set.

(Seventh Display Example)

Figure 36:
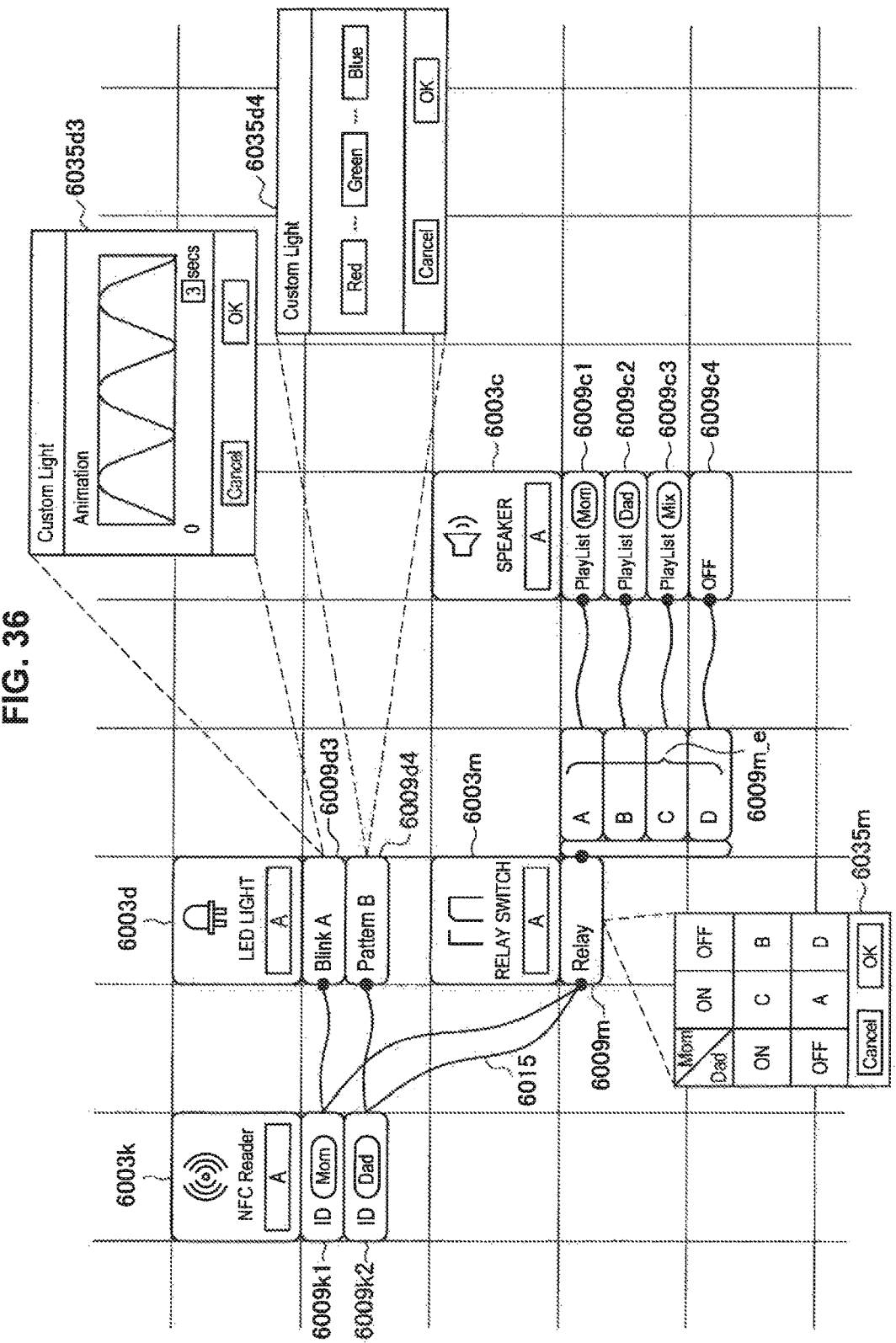
FIG. 36 is a diagram illustrating a seventh display example according to a second embodiment of the present disclosure.

FIG. 36 is a diagram illustrating a seventh display example according to the second embodiment of the present disclosure. In the example of FIG. 36, a mechanism in which, when an NFC reader installed in a place for keys at a front entrance reads an IC tag embedded in a key ring, any one of a mother and a father who has returned home is detected, and an LED lamp lights up, or music on a playlist is reproduced accordingly is realized.

In the illustrated example, operation icons 6009*k*1 and 6009*k*2 are associated with an element icon 6003*k* indicating the NFC reader. The operation icon 6009*k* indicates an operation of detecting the ID of the mother through communication with the IC tag. Meanwhile, the operation icon 6009*k*2 indicates an operation of detecting the ID of the father through communication with the IC tag. Links 6015 form a two-track connection between the operation icons 6009*k*1 and 6009*k*2 and operation icons 6009*d*3 and 6009*d*4 of an element icon 6003*d* indicating the LED lamp 100*f*. Thus, when the mother is detected to have returned home (the operation icon 6009*k*1), the LED lamp 100*f* blinks in a pattern A (the operation icon 6009*d*3), and when the father is detected to have returned home (the operation icon 6009*k*2), the LED lamp 100*f* blinks in a pattern B (the operation icon 6009*d*4). Note that an operation property 6035*d*3 for setting a blinking pattern for the operation icon 6009*d*3 is displayed, and an operation property 6035*d*4 is displayed for setting a blinking color pattern for the operation icon 6009*d*4.

On the other hand, both the operation icons 6009*k*1 and 6009*k*2 are connected to an operation icon 6009*m* of an element icon 6003*m* indicating a software element "relay switch" by other links 6015. The software element "relay switch" switches, as a special function, a state of the switch according to a state indicated by a triggering operation when the operation occurs in another element More specifically, the software element "relay switch" indicated by the element icon 6003*m* in the illustrated example switches states between A to D as indicated by an operation property 6035*m* based on a state of "mother at home" ("Mom" is ON) indicated by an operation of the operation icon 6009*k*1, and a state of "father at home" ("Dad" is ON) indicated by an operation of the operation icon 6009*k*2. These states from A to D are indicated by an extension 6009*m_e* of the operation icon 6009*m*.

Parts corresponding to the four states A to D included in the extension 6009*m_e* are connected to operation icons of an element icon 6003*c* indicating the speaker 100*e* respectively in a quadruple track manner. Thus, operations in which a playlist for the mother is reproduced (an operation icon 6009*c*1) in the state A (only mother at home), a playlist for the father is reproduced (an operation icon 6009*c*2) in the state B (only father at home), a mixed playlist is reproduced in the state C (mother and father at home), and no playlist is reproduced in the state D (neither of them at home) are realized.

(Eighth Display Example)

Figure 37:
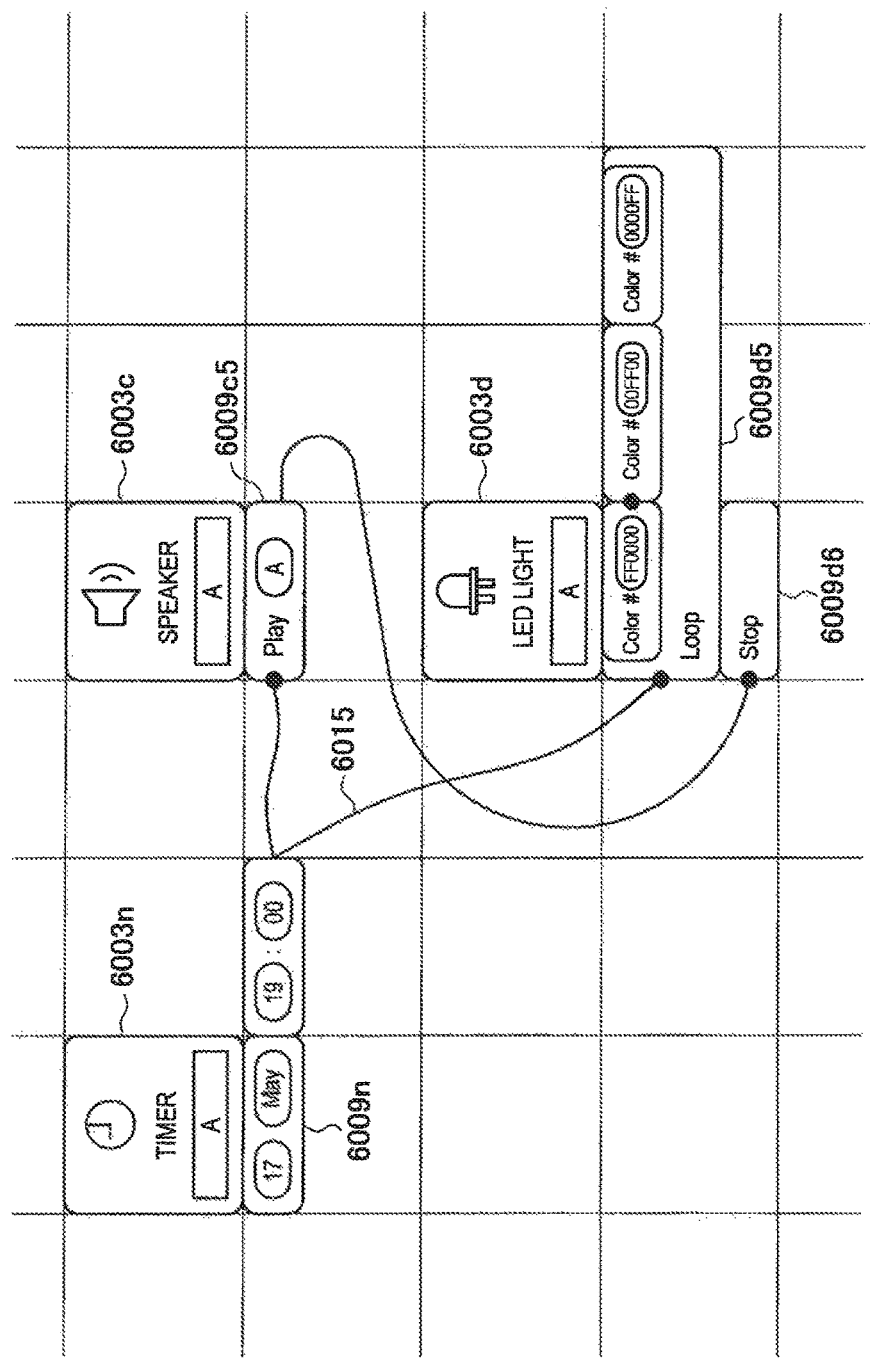
FIG. 37 is a diagram illustrating an eighth display example according to a second embodiment of the present disclosure.

FIG. 37 is a diagram illustrating an eighth display example according to the second embodiment of the present disclosure. In the example of FIG. 37, a mechanism in which a sound is reproduced by the speaker 100*e* at a predetermined time on a predetermined date and the LED lamp 100*f* repetitively lights up in a predetermined pattern during the reproduction of the sound is realized.

In the illustrated example, an operation icon 6009*n* is associated with an element icon 6003*n* indicating a software element "timer." The operation icon 6009*n* indicates an operation of a trigger occurring at a predetermined time on a predetermined date (19:00, May 17). A link 6015 connected to the operation icon 6009*n* forms branches to an operation icon 6009*c*5 of an element icon 6003*c* indicating the speaker 100*e* and to an operation icon 6009*d*5 of an element icon 600*d* indicating the LED lamp 100*f*. Thus, in the illustrated example, when a trigger is operated at the predetermined time on the predetermined date (the operation icon 6009*n*), an operation of the LED lamp 100*f* repetitively lighting up in a predetermined pattern (the operation icon 6009*d*5) occurs in synchronization with an operation of the speaker 100*e* reproducing a sound (an operation icon 6009*c*). With this operation icon 6009*c*5, a sound to be reproduced may be designated. In addition, with the operation icon 6009*d*5, a light emission color constituting a lighting pattern can be designated.

Furthermore, in the illustrated example, an operation icon 6009*c*5 is connected to an operation icon 6009*d*6 of an element icon 6003*d*. That is, in the illustrated example, an operation indicated by the operation icon 6009*c*5 (reproduction of a sound by the speaker 100*e*) and an operation indicated by the operation icon 6009*d*5 (lighting of the LED lamp 100*f*) occur synchronously, and then an operation indicated by an operation icon 6009*d*6 (a stop of the reproduction of the sound by the speaker 100*e*) occurs following the operation indicated by the operation icon 6009*c*5 (the reproduction of the sound by the speaker 100*e*). In this manner, by combining a branch of a link and series linkage of icons, an advanced linked operation can be realized with a limited number of elements in the present embodiment.

(Ninth Display Example)

Figure 38:
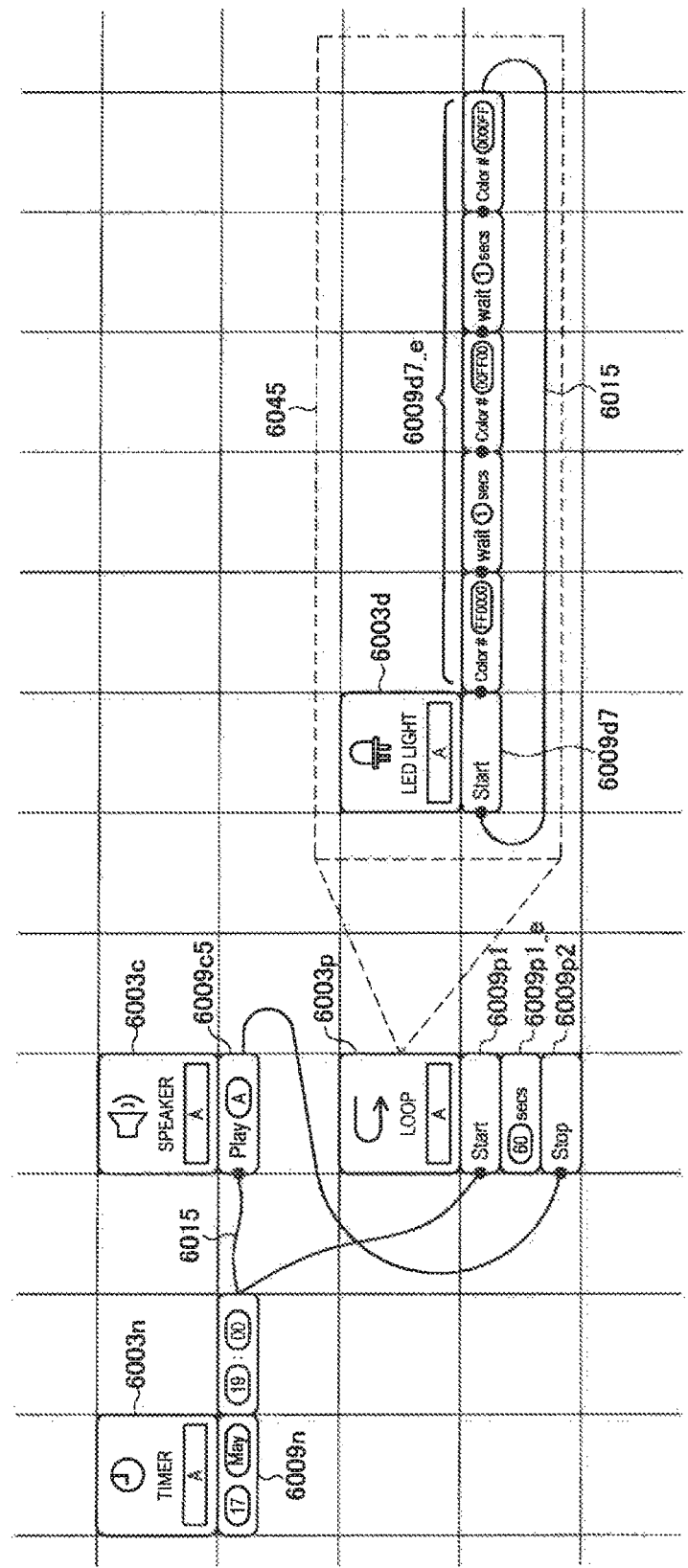
FIG. 38 is a diagram illustrating a ninth display example according to a second embodiment of the present disclosure.

FIG. 38 is a diagram illustrating a ninth display example according to the second embodiment of the present disclosure. In the example of FIG. 38, icons similar to those in the example described with reference to FIG. 37 above are disposed and similar functions are realized; however, the element icon 6003*d* portion is replaced with an element icon 6003*p* indicating a software element "loop" and operation icons 6009*p*1 and 6009*p*2.

The software element "loop" indicated by the element icon 6003*p* repetitively controls an operation displayed in a loop setting window 6045. The loop setting window 6045 is displayed as a sub window on a screen displayed on a display as a user interface. In the loop setting window 6045, a linked operation to be set as a loop can be expressed with an element icon 6003, an operation icon 6009, and a link 6015. In the illustrated example, the element icon 6003*d* indicating the LED lamp 100*f*, and the operation icon 6009*d*7 are disposed in the loop setting window 6045. An extension 6009*d*7_*e* defining a lighting color and an interval is associated with the operation icon 6009*d*7. In the illustrated example, a terminal of the extension 6009*d*7_*e* is connected to the operation icon 6009*d*7 by the link 6015 in a cyclic form, and thus the loop is illustrated to be completed with an operation of the LED lamp 100*f*. In another example, other element icons 6003 and operation icons 6009 may be disposed in the loop setting window 6045 and a loop process by a plurality of elements and a plurality of operations may be defined.

Meanwhile, the operation icon 6009*p*1 associated with the element icon 6003*p* indicating the software element "loop" indicates a loop start operation. In the illustrated example, when a trigger is operated at the predetermined time on the predetermined date in the operation indicated by the operation icon 6009*n*, the loop process defined in the loop setting window 6045 is started. The operation icon 6009*p*1 may be associated with an extension 6009*p*1_*e* indicating duration of the loop process. Meanwhile, the operation icon 6009*p*2 associated with the element icon 6003*p* indicates a loop process end operation. In the illustrated example, when a sound reproduction operation indicated by the operation icon 6009*c*5 is finished, the loop process defined in the loop setting window 6045 is finished. As in the illustrated example, when an end of the loop process is defined with both the extension 6009*p*1_*e* and the operation icon 6009*p*2, an earlier or later process, for example, may be preferentially employed.

3. Hardware Configuration

Figure 39:
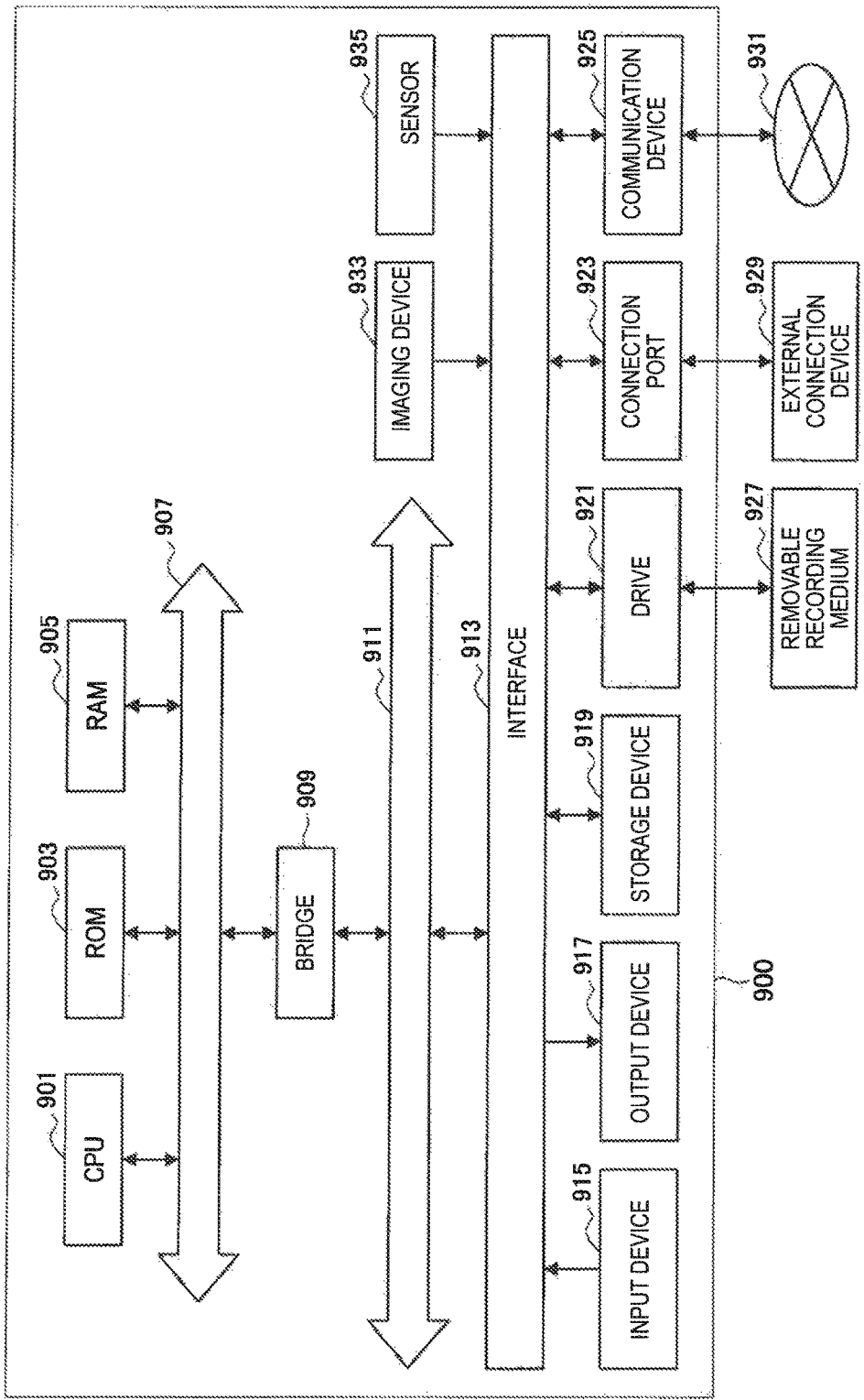
FIG. 39 is a block diagram illustrating an example of a hardware configuration of an information processing device according to an embodiment of the present disclosure.

Next, with reference to FIG. 39, a hardware configuration of an information processing device according to an embodiment of the present disclosure will be described. FIG. 39 is a block diagram illustrating an example of a hardware configuration of the information processing device according to the embodiment of the present disclosure. The illustrated information processing device 900 can realize the element 100, the manager 200, the server 300, and/or the UI device 400 in the above described embodiment.

The information processing device 900 includes a central processing unit (CPU) 901, a read only memory (ROM) 903, and a random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. Moreover, the information processing device 900 may include an imaging device 933 and a sensor 935, when necessary. The information processing device 900 may include a processing circuit such as a digital signal processor (DSP) or an application-specific integrated circuit (ASIC), instead of or in addition to the CPU 901.

The CPU 901 functions as an arithmetic processing device and a control device, and controls overall or some of the operations of the information processing device 900 according to various programs recorded in the ROM 903, the RAM 905, the storage device 919, or a removable recording medium 927. The ROM 903 stores programs, operation parameters, and the like used by the CPU 901. The RAM 905 transiently stores programs used when the CPU 901 is executed, and parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may be a remote control device that uses, for example, infrared radiation and another type of radio waves. Alternatively, the input device 915 may be an external connection device 929 such as a mobile phone that corresponds to an operation of the information processing device 900. The input device 915 includes an input control circuit that generates input signals on the basis of information which is input by a user to output the generated input signals to the CPU 901. The user inputs various types of data and indicates a processing operation to the information processing device 900 by operating the input device 915.

The output device 917 includes a device that can visually or audibly report acquired information to a user. The output device 917 may be, for example, a display device such as a liquid crystal display (LCD), a plasma display panel (PDP), and an organic electro-luminescence (EL) display, an audio output device such as a speaker and a headphone, and a printer. The output device 917 outputs a result obtained through a process performed by the information processing device 900, in the form of text or video such as an image, or sounds such as voice and audio sounds.

The storage device 919 is a device for data storage that is an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores therein the programs executed by the CPU 901 and various data, and various data acquired from an outside.

The drive 921 is a reader/writer for the removable recording medium 927 such as a magnetic disk, an optical disc, a magneto-optical disk, and a semiconductor memory, and built in or externally attached to the information processing device 900. The drive 921 reads out information recorded on the mounted removable recording medium 927, and outputs the information to the RAM 905. The drive 921 writes the record into the mounted removable recording medium 927.

The connection port 923 is a port used to directly connect devices to the information processing device 900. The connection port 923 may be a Universal Serial Bus (USB) port, an IEEE1394 port, or a Small Computer System Interface (SCSI) port, for example. The connection port 923 may also be an RS-232C port, an optical audio terminal, a High-Definition Multimedia Interface (HDMI (a registered trademark)) port, and so on. The connection of the external connection device 929 to the connection port 923 makes it possible to exchange various kinds of data between the information processing device 900 and the external connection device 929.

The communication device 925 is a communication interface including, for example, a communication device for connection to a communication network 931. The communication device 925 may be, for example, a wired or wireless local area network (LAN), Bluetooth (a registered trademark), or a communication card for a wireless USB (WUSB). The communication device 925 may also be, for example, a router for optical communication, a router for asymmetric digital subscriber line (ADSL), or a modem for various types of communication. For example, the communication device 925 transmits and receives signals on the Internet or transits signals to and receives signals from another communication device by using a predetermined protocol such as TCP/IP. The communication network 931 to which the communication device 925 connects is a network established through wired or wireless connection. The communication network 931 is, for example, the Internet, a home LAN, infrared communication, radio wave communication, or satellite communication.

The imaging device 933 is a device that shoots a real space by using an image sensor such as a charge coupled device (CCD) and a complementary metal oxide semiconductor (CMOS), and various members such as a lens for controlling image formation of a subject image onto the image sensor, and generates the shot image. The imaging device 933 may shoot a still image or a moving image.

The sensor 935 is various sensors such as an acceleration sensor, a gyro sensor, a geomagnetic sensor, an optical sensor, and a sound sensor. The sensor 935 acquires information regarding a state of the information processing device 900 itself such as a posture of a housing of the information processing device 900, and information regarding an environment surrounding the information processing device 900 such as luminous intensity and noise around the information processing device 900. The sensor 935 may include a Global Positioning System (GPS) sensor that receives GPS signals to measure latitude, longitude, and altitude of the device.

The example of the hardware configuration of the information processing device 900 has been described. Each of the structural elements described above may be configured by using a general purpose component or may be configured by hardware specialized for the function of each of the structural elements. The configuration may be appropriately changed in accordance with the state of the art at the time of working of the present disclosure.

4. Supplement

An embodiment of the present disclosure can include, for example, the information processing device described above (the UI device, the manager or the server which controls provision of a user interface to the UI device, or an element which also functions as a manager), a system, an information processing method executed by the information processing device or the system, a program for causing the information processing device to function, and a non-transient tangible medium in which the program is recorded.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although examples in which, for example, element icons and operation icons are displayed as icons, and the operation icons are connected to each other by links have been described in the above-described embodiments, embodiments of the present disclosure is not limited thereto. When, for example, operations of at least some elements are substantially specified with no operation icons displayed, the element icons, or an element icon and an operation icon associated with another element icon may be connected to each other by a link.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing device including:

a display control unit configured to cause a plurality of icons indicating hardware elements or software elements that perform a linked operation together, and a link connecting the plurality of icons to each other to be displayed, wherein a spatial sequence of the plurality of icons formed by the link corresponds to a temporal sequence of operations of the software elements or the hardware elements indicated by the plurality of icons.

(2)

The information processing device according to (1), wherein the spatial sequence includes serial linkage of the plurality of icons.

(3)

The information processing device according to (1) or (2), wherein the plurality of icons include a first icon and a plurality of second icons, and the spatial sequence includes branches from the first icon to the respective second icons.

(4)

The information processing device according to any one of (1) to (3), wherein the icons include element icons each indicating a type of the software element or the hardware element, and operation icons each indicating a type of an operation of the software element or the hardware element, and the link connects the operations icons to each other.

(5)

The information processing device according to (4), wherein the operation icons include a plurality of icons indicating a plurality of operations that occur independently of each other.

(6)

The information processing device according to (5), wherein the plurality of icons include a first icon and a second icon, and each of a plurality of operation icons included in the first icon and each of a plurality of operation icons included in the second icon are connected by the link in a two-track manner.

(7)

The information processing device according to (5), wherein the plurality of icons include a first icon and a plurality of second icons, and a plurality of operation icons included in the first icon are connected to respective operation icons by the link, each of the respective operation icons being included in a corresponding one of the second icons, and thus branches from the first icon to the respective second icons are formed.

(8)

The information processing device according to (4), wherein the plurality of icons include a first icon and a plurality of second icons, and a single operation icon included in the first icon is connected to operation icons included in the respective second icons by the link, and thus branches from the first icon to the respective second icons are formed.

(9)

The information processing device according to any one of (1) to (8), wherein the display control unit further causes a field in which the plurality of icons are disposed to be displayed, wherein a first direction is defined in the field, and wherein the link connects each of the icons in the first direction.

(10)

The information processing device according to (9), wherein each of the icons includes a socket icon to which the link is connected, and the plurality of icons include a terminal icon of which one side in the first direction has the socket icon, and an intermediate icon of which each side in the first direction has the socket icon.

(11)

The information processing device according to (9) or (10), wherein the display control unit further causes grid lines in the first direction and a second direction intersecting the first direction to be displayed in the field.

(12)

The information processing device according to (11), further including:

an operation acquisition unit configured to acquire a first user operation of designating the grid line, wherein the display control unit divides the grid line designated through the first user operation, and inserts a new row or column between the divided grid lines.

(13)

The information processing device according to (12), wherein the first user operation includes an operation of selecting the grid line, or a pinch-out operation at a position crossing the grid line.

(14)

The information processing device according to any one of (11) to (13), further including:

an operation acquisition unit configured to acquire a second user operation of designating a row or a column defined by the grid lines, wherein the display control unit deletes a row or a column designated through the second user operation, and integrates the grid lines at both sides of the deleted row or column.

(15)

The information processing device according to (14), wherein the second user operation includes an operation of selecting the row or the column, or a pinch-in operation at a position crossing at least a part of the row or the column.

(16)

The information processing device according to any one of (11) to (15), wherein each of the icons is aligned with the grid lines.

(17)

A display control method including:

causing a plurality of icons indicating hardware elements or software elements that perform a linked operation together, and a link connecting the plurality of icons to each other to be displayed, wherein a spatial sequence of the plurality of icons formed by the link corresponds to a temporal sequence of operations of the software elements or the hardware elements indicated by the plurality of icons.

(18)

A program to be executed by a processing circuit of an information processing device to realize a function of causing a plurality of icons indicating hardware elements or software elements that perform a linked operation together, and a link connecting the plurality of icons to each other to be displayed, wherein a spatial sequence of the plurality of icons formed by the link corresponds to a temporal sequence of operations of the software elements or the hardware elements indicated by the plurality of icons.

REFERENCE SIGNS LIST 10 system
100 element
110 communication unit
120 control unit
130 function unit
140 power source unit
200 manager
210 communication unit
220 control unit
230 storage unit
300 server
310 communication unit
320 control unit
330 storage unit
400 UI device
410 communication unit
420 control unit
430 input/output unit
5002 field
5003 element icon
5005 grid line
5009 operation icon
5011 socket icon
5015 link

The invention claimed is:

1. An information processing device comprising:

a display control unit configured to cause a plurality of icons indicating hardware elements and software elements that perform a linked operation synchronously, and a link connecting the plurality of icons to each other to be displayed, wherein a spatial sequence of the plurality of icons formed by the link corresponds to a temporal sequence of operations of the software elements and the hardware elements indicated by the plurality of icons, wherein the plurality of icons include an element icon indicating a type of hardware element or software element and an operation icon indicating a type of an operation of the element icon, wherein the link connects a plurality of operation icons to perform the linked operation, wherein the spatial sequence includes serial linkage of the plurality of icons indicating hardware elements, wherein the plurality of operation icons indicate a plurality of operations that occur independently of each other, wherein each of the hardware elements include a controller, and the software elements configure the hardware elements, wherein at least one of the hardware elements includes a button and a microphone, wherein at least one of the linked operations is triggered by an input detected on the microphone, and wherein the display control unit is implemented via at least one processor.

2. The information processing device according to claim 1, wherein the linked operation is triggered by an input detected on the microphone after the button is pushed.

3. A display control method comprising:

causing, by an information processing device, a plurality of icons indicating hardware elements and software elements that perform a linked operation synchronously, and a link connecting the plurality of icons to each other to be displayed, wherein a spatial sequence of the plurality of icons formed by the link corresponds to a temporal sequence of operations of the software elements and the hardware elements indicated by the plurality of icons, wherein the plurality of icons include an element icon indicating a type of hardware element or software element and an operation icon indicating a type of an operation of the element icon, wherein the link connects a plurality of operation icons to perform the linked operation, wherein the spatial sequence includes serial linkage of the plurality of icons indicating hardware elements, wherein the plurality of operation icons indicate a plurality of operations that occur independently of each other, wherein each of the hardware elements include a controller, and the software elements configure the hardware elements, wherein at least one of the hardware elements includes a button and a microphone, and wherein at least one of the linked operations is triggered by an input detected on the microphone.

4. The display control method according to claim 3, wherein the plurality of icons include a first icon and a plurality of second icons, and the spatial sequence includes branches from the first icon to respective second icons.

5. The display control method according to claim 3, wherein the plurality of icons include a first icon and a second icon, and each operation icon of a plurality of operation icons included in the first icon and each operation icon of a plurality of operation icons included in the second icon are connected by the link in a two-track manner.

6. The display control method according to claim 3, wherein the plurality of icons include a first icon and a plurality of second icons, and a plurality of operation icons included in the first icon are connected to respective operation icons by the link, each of the respective operation icons being included in a corresponding one icon of the plurality of second icons, and thus branches from the first icon to respective second icons are formed.

7. The display control method according to claim 3, wherein the plurality of icons include a first icon and a plurality of second icons, and a single operation icon included in the first icon is connected to operation icons included in respective second icons by the link, and thus branches from the first icon to the respective second icons are formed.

8. The display control method according to claim 3, further comprising:

causing a field in which the plurality of icons are disposed to be displayed, wherein a first direction is defined in the field, and wherein the link connects each icon of the plurality of icons in the first direction.

9. The display control method according to claim 8, wherein each icon of the plurality of icons includes a socket icon to which the link is connected, and the plurality of icons include a terminal icon of which one side in the first direction includes the socket icon, and an intermediate icon of which each side in the first direction includes the socket icon.

10. The display control method according to claim 8, further comprising:

causing a plurality of grid lines in the first direction and a second direction intersecting the first direction to be displayed in the field.

11. The display control method according to claim 10, further comprising:

acquiring a first user operation of designating a grid line of the plurality of grid lines;

dividing the designated grid line through the first user operation; and inserting a new row or column between the divided grid line.

12. The display control method according to claim 11, wherein the first user operation includes an operation of selecting the designated grid line, or a pinch-out operation at a position crossing the designated grid line.

13. The display control method according to claim 10, further comprising:

acquiring a second user operation of designating a row or a column defined by the grid lines;

deleting the row or the column designated through the second user operation; and integrating the grid lines at both sides of the deleted row or the deleted column.

14. The display control method according to claim 13, wherein the second user operation includes an operation of selecting the row or the column, or a pinch-in operation at a position crossing at least a part of the row or the column.

15. The display control method according to claim 10, wherein each icon of the plurality of icons is aligned with the grid lines.

16. The display control method according to claim 3, wherein a first operation of the hardware elements includes acquiring information regarding an environment surrounding the information processing device, wherein an operation of the software elements includes performing an analysis of the acquired information regarding the environment surrounding the information processing device, and wherein a second operation of the hardware elements include performing an operation based on a result of the analysis.

17. The display control method according to claim 3, wherein the link is generated by connecting two specified icons by dragging a plug icon and inserting the plug icon into one of the two specified icons, and wherein one of the two specified icons is disposed on a side of one icon of the plurality of icons, and another of the two specified icons is disposed on a side of another icon of the plurality of icons.

18. The display control method according to claim 3, wherein the link is generated by connecting two specified icons by dragging a plug icon and inserting the plug icon into one of the two specified icons, and wherein a connection between the two specified icons is generated by dragging the plug icon connected to one of two specified icons and inserting the plug icon into another of the two specified icons thereby connecting the two specified icons.

19. The display control method according to claim 18, wherein the plug icon and the link are initially displayed based on detecting a selection of one of the two specified icons, and wherein the plug icon and the link is not displayed before the detecting of the selection of one of the two specified icons.

20. The display control method according to claim 18, wherein the link is connected to the plug icon, and wherein the link is drawn out from the one specified icon by dragging the plug icon.

21. The display control method according to claim 18, wherein, when the dragging of the plug icon is released in a state in which the plug icon is not inserted into the another of the two specified icons, the plug icon and the link is not displayed.

22. The display control method according to claim 18, wherein, the plug icon is deleted based on detecting the inserting of the plug icon into the another of the two specified icons.

23. The display control method according to claim 3, wherein the synchronously performed linked operation is performed at substantially the same time.

24. A non-transitory computer-readable storage medium having embodied thereon a program, which when executed by a processing circuit of an information processing device causes the processing circuit to execute a method, the method comprising:
   causing a plurality of icons indicating hardware elements and software elements that perform a linked operation synchronously, and a link connecting the plurality of icons to each other to be displayed,
   wherein a spatial sequence of the plurality of icons formed by the link corresponds to a temporal sequence of operations of the software elements and the hardware elements indicated by the plurality of icons,
   wherein the plurality of icons include an element icon indicating a type of hardware element or software element and an operation icon indicating a type of an operation of the element icon, wherein the link connects a plurality of operation icons to perform the linked operation,
   wherein the spatial sequence includes serial linkage of the plurality of icons indicating hardware elements,
   wherein the plurality of operation icons indicate a plurality of operations that occur independently of each other,
   wherein each of the hardware elements include a controller, and the software elements configure the hardware elements,
   wherein at least one of the hardware elements includes a button and a microphone, and
   wherein at least one of the linked operations is triggered by an input detected on the microphone.

* * * * *